United States Patent
Nickel et al.

(10) Patent No.: US 10,375,473 B2
(45) Date of Patent: Aug. 6, 2019

(54) DISTRIBUTED ENVIRONMENTAL MICROPHONES TO MINIMIZE NOISE DURING SPEECH RECOGNITION

(71) Applicant: Vocollect, Inc., Pittsburgh, PA (US)

(72) Inventors: Sean Nickel, Monroeville, PA (US); Dale McGary, Pittsburgh, PA (US); Matthew Aaron Nichols, Pittsburgh, PA (US); Michael Kloehn, Pittsburgh, PA (US)

(73) Assignee: Vocollect, Inc., Pittsburgh, PA (US)

(*) Notice: Subject to any disclaimer, the term of this patent is extended or adjusted under 35 U.S.C. 154(b) by 111 days.

(21) Appl. No.: 15/270,460

(22) Filed: Sep. 20, 2016

(65) Prior Publication Data

US 2018/0082702 A1  Mar. 22, 2018

(51) Int. Cl.
*G10L 19/00*  (2013.01)
*H04R 3/00*  (2006.01)
(Continued)

(52) U.S. Cl.
CPC .............. *H04R 3/005* (2013.01); *G10L 15/20* (2013.01); *G10L 21/0208* (2013.01);
(Continued)

(58) Field of Classification Search
None
See application file for complete search history.

(56) References Cited

U.S. PATENT DOCUMENTS 3,939,689 A * 2/1976 Desarzens ............ G04D 7/1207
702/178
5,267,323 A * 11/1993 Kimura ................. G08C 23/04
381/110
(Continued)

FOREIGN PATENT DOCUMENTS

WO  2013163789 A1  11/2013
WO  2013173985 A1  11/2013
(Continued)

OTHER PUBLICATIONS

U.S. Appl. No. 14/715,916 for Evaluating Image Values filed May 19, 2015 (Ackley); 60 pages.
(Continued)

*Primary Examiner* — Richard Z Zhu
(74) *Attorney, Agent, or Firm* — Additon, Higgins & Pendleton, P.A.

(57) ABSTRACT

A device, system, and method whereby a speech-driven system used in an industrial environment distinguishes speech obtained from users of the system from other background sounds. In one aspect, the present system and method provides for a first audio stream from a user microphone collocated with a source of human speech (that is, a user) and a second audio stream from a environmental microphone which is proximate to the source of human speech but more remote than the user microphone. The audio signals from the two microphones are asynchronous. A processor is configured to identify a common, distinctive sound event in the environment, such as an impulse sound
(Continued)

Exemplary Environment or a periodic sound signal. Based on the common sound event, the processor provides for synchronization of the two audio signals. In another aspect, the present system and method provides for a determination of whether or not the sound received at the user microphone is suitable for identification of words in a human voice, based on a comparison of sound elements in the first audio stream and the second audio stream, for example based on a comparison of the sound intensities of the sound elements in the audio streams.

28 Claims, 7 Drawing Sheets

(51) Int. Cl.
*G10L 15/20* (2006.01)
*G10L 21/0216* (2013.01)
*G10L 21/0264* (2013.01)
*H04R 29/00* (2006.01)
*G10L 21/0208* (2013.01)

(52) U.S. Cl.
CPC ..... *G10L 21/0264* (2013.01); *G10L 2021/02161* (2013.01); *G10L 2021/02165* (2013.01); *H04R 29/005* (2013.01)

(56) References Cited

U.S. PATENT DOCUMENTS

| | | | |
|---|---|---|---|
| 5,732,143 | A * | 3/1998 | Andrea ............... G10K 11/178 381/71.13 |
| 6,832,725 | B2 | 12/2004 | Gardiner et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,516,068 | B1 | 4/2009 | Clark |
| 7,726,575 | B2 | 6/2010 | Wang et al. |
| 8,294,969 | B2 | 10/2012 | Plesko |
| 8,317,105 | B2 | 11/2012 | Kotlarsky et al. |
| 8,322,622 | B2 | 12/2012 | Liu |
| 8,366,005 | B2 | 2/2013 | Kotlarsky et al. |
| 8,371,507 | B2 | 2/2013 | Haggerty et al. |
| 8,376,233 | B2 | 2/2013 | Van Horn et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Horn et al. |
| 8,408,469 | B2 | 4/2013 | Good |
| 8,424,768 | B2 | 4/2013 | Rueblinger et al. |
| 8,448,863 | B2 | 5/2013 | Xian et al. |
| 8,457,013 | B2 | 6/2013 | Essinger et al. |
| 8,459,557 | B2 | 6/2013 | Havens et al. |
| 8,469,272 | B2 | 6/2013 | Kearney |
| 8,474,712 | B2 | 7/2013 | Kearney et al. |
| 8,479,992 | B2 | 7/2013 | Kotlarsky et al. |
| 8,490,877 | B2 | 7/2013 | Kearney |
| 8,517,271 | B2 | 8/2013 | Kotlarsky et al. |
| 8,523,076 | B2 | 9/2013 | Good |
| 8,528,818 | B2 | 9/2013 | Ehrhart et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van Horn et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein |
| 8,561,905 | B2 | 10/2013 | Edmonds et al. |
| 8,565,107 | B2 | 10/2013 | Pease et al. |
| 8,571,307 | B2 | 10/2013 | Li et al. |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,678,285 | B2 | 3/2014 | Kearney |
| 8,678,286 | B2 | 3/2014 | Smith et al. |
| 8,682,077 | B1 | 3/2014 | Longacre |
| D702,237 | S | 4/2014 | Oberpriller et al. |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,698,949 | B2 | 4/2014 | Grunow et al. |
| 8,702,000 | B2 | 4/2014 | Barber et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,727,223 | B2 | 5/2014 | Wang |
| 8,740,082 | B2 | 6/2014 | Wilz |
| 8,740,085 | B2 | 6/2014 | Furlong et al. |
| 8,746,563 | B2 | 6/2014 | Hennick et al. |
| 8,750,445 | B2 | 6/2014 | Peake et al. |
| 8,752,766 | B2 | 6/2014 | Xian et al. |
| 8,756,059 | B2 | 6/2014 | Braho et al. |
| 8,757,495 | B2 | 6/2014 | Qu et al. |
| 8,760,563 | B2 | 6/2014 | Koziol et al. |
| 8,763,909 | B2 | 7/2014 | Reed et al. |
| 8,777,108 | B2 | 7/2014 | Coyle |
| 8,777,109 | B2 | 7/2014 | Oberpriller et al. |
| 8,779,898 | B2 | 7/2014 | Havens et al. |
| 8,781,520 | B2 | 7/2014 | Payne et al. |
| 8,783,573 | B2 | 7/2014 | Havens et al. |
| 8,789,757 | B2 | 7/2014 | Barten |
| 8,789,758 | B2 | 7/2014 | Hawley et al. |
| 8,789,759 | B2 | 7/2014 | Xian et al. |
| 8,794,520 | B2 | 8/2014 | Wang et al. |
| 8,794,522 | B2 | 8/2014 | Ehrhart |
| 8,794,525 | B2 | 8/2014 | Amundsen et al. |
| 8,794,526 | B2 | 8/2014 | Wang et al. |
| 8,798,367 | B2 | 8/2014 | Ellis |
| 8,807,431 | B2 | 8/2014 | Wang et al. |
| 8,807,432 | B2 | 8/2014 | Van Horn et al. |
| 8,820,630 | B2 | 9/2014 | Qu et al. |
| 8,822,848 | B2 | 9/2014 | Meagher |

(56) References Cited

U.S. PATENT DOCUMENTS

| | | |
|---|---|---|
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,113,240 B2 | 8/2015 | Ramakrishnan et al. |
| 9,129,611 B2 * | 9/2015 | Nishino .............. G10L 25/51 |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 9,767,818 B1 * | 9/2017 | Jain .................... G10L 21/0208 |
| 2003/0101048 A1 * | 5/2003 | Liu .................... G10L 21/0208 704/208 |
| 2004/0054528 A1 * | 3/2004 | Hoya .................. G06K 9/0051 704/211 |
| 2007/0063048 A1 | 3/2007 | Havens et al. |
| 2009/0134221 A1 | 5/2009 | Zhu et al. |
| 2009/0238377 A1 * | 9/2009 | Ramakrishnan ...... G10L 21/028 381/92 |
| 2009/0285410 A1 * | 11/2009 | Garcia ................ G10L 21/0208 381/94.1 |
| 2010/0074460 A1 * | 3/2010 | Marzetta ................ G02C 11/06 381/313 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0058676 A1 * | 3/2011 | Visser ............................. 381/17 |
| 2011/0096941 A1 * | 4/2011 | Marzetta ................ G06F 3/013 381/92 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0123772 A1 * | 5/2012 | Thyssen .............. G10L 21/0208 704/226 |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0262101 A1 * | 10/2013 | Srinivasan .......... G10L 21/0208 704/226 |
| 2013/0270346 A1 | 10/2013 | Xian et al. |
| 2013/0287258 A1 | 10/2013 | Kearney |

(56) References Cited

U.S. PATENT DOCUMENTS

| | | |
|---|---|---|
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |

(56) References Cited

U.S. PATENT DOCUMENTS

| | | |
|---|---|---|
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2015/0365762 A1* | 12/2015 | Truon ............. H04R 3/005 381/71.1 |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2018/0033428 A1* | 2/2018 | Kim .................. G10L 15/08 |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.
Honeywell Scanning & Mobility, "Dolphin 75e, Hand Held Computer Data Sheet", Dated Jun. 2015; 2 pages.
Honeywell Scanning & Mobility, "Vocollect SRX2 Wireless Headset Data Sheet", Dated Oct. 2014; 2 pages.
Supply Chain Digest, "Supply Chain Digest Tech Note: New Voice Headset from Vocollect Sets New Standard for the Market", Dated 2012, published in DistributionDigest, 3 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.

* cited by examiner

Exemplary Method to Distinguish User Speech from Background Sounds

Exemplary Method to Synchronize Asynchronous Audio Signals

Exemplary Transmission of Sound Pulses to Microphones and Speech Recog. Dev.

DISTRIBUTED ENVIRONMENTAL MICROPHONES TO MINIMIZE NOISE DURING SPEECH RECOGNITION

FIELD OF THE INVENTION

The present invention relates to a method and apparatus for recognition of human speech, and more particularly, to a method and apparatus to distinguish user speech which is the desired focus of machine-interpretation from extraneous background sounds.

BACKGROUND

In modern production environments, it is increasingly desirable for human operators to be able to record data and to control electronic devices in a "hands-free" mode, typically via speech control. This typically entails the use of portable electronic voice-processing devices which can detect human speech, interpret the speech, and process the speech to recognize words, to record data, and/or to control nearby electronic systems.

Voice-driven systems typically include at least one microphone and at least one processor-based device (e.g., computer system) which is operated in response to human voice or spoken input, for instance spoken commands and/or spoken information.

There are numerous applications in which voice-driven systems may be employed. For instance, there are many applications where it is advantageous for a user to have their hands free to perform tasks other than operating a keyboard, keypad, mouse, trackball or other user input device. An example of one such application is a warehouse, where a user may need to handle items such as boxes while concurrently interacting with a processor-based device. Another example application is a courier or delivery person, who may be handling parcels or driving a vehicle while concurrently interacting with a processor-based device. Yet another example application is a medical care provider, who may be using their hands during the performance of therapeutic or diagnostic medical services, while concurrently interacting with a processor-based device. There are of course numerous other examples of applications.

In many of these exemplary applications it is also advantageous or even necessary for the user to be mobile. For applications in which mobility is desirable, the user may wear a headset and a portable processor-based device. The headset typically includes at least one loud-speaker and/or microphone. The portable processor-based device typically takes the form of a wearable computer system. The headset is communicatively coupled to the portable processor-based device, for instance via a coiled wire or a wireless connection, for example, a Bluetooth connection.

In some applications, the portable processor-based device may in turn be communicatively coupled to a host or backend computer system (e.g., server computer). In many applications, two or more portable processor-based devices (clients) may be communicatively coupled to the host or backend computer system/server.

The server may function as a centralized computer system providing computing and data-processing functions to various users via respective portable processor-based devices and headsets. Such may, for example, be advantageously employed in an inventory management system in which a central/server computer system performs tracking and management; a plurality of users each wearing respective portable computer systems and headsets interface with the central or server computer system.

This client (headset)/server approach allows the user(s) to receive audible instructions and/or information from the server of the voice driven system. For instance, the user may: receive voice instructions from the server; may ask questions of the server; may provide to the server reports on progress of their assigned tasks; and may also report working conditions, such as inventory shortages, damaged goods or parcels; and/or the user may receive directions such as location information which specifies factory (or warehouse) locations for picking up or delivering goods.

Background Sounds:

Voice driven systems are often utilized in noisy environments where various extraneous sounds interfere with voice or spoken input. For example, in a warehouse or logistics center environment, extraneous sounds are often prevalent, including for instance: public address announcements; conversations from persons which are not intended as input; sounds from the movement of boxes or pallets; noise from the operation of lift vehicles (e.g., forklifts); impulse sounds, i.e., relatively sharp, sudden sounds as may arise from dropped objects, slammed doors, and other brief-but-loud sound events; and noises from the operations of other machines, including electric motor noises, compressor sounds, and similar.

To be effective, voice driven systems need to distinguish between voice or speech as intended input versus extraneous background sounds (including but not limited to unwanted voices) which may otherwise be erroneously interpreted as desired speech from a headset-wearing user.

In the past, there have been two primary methods for rejecting background noise to the speech detector. In a first method, a noise cancelling microphone was used which would reject sound directionally. A second method would employ multiple microphones, typically with all the microphones mounted on the user's headset or person (i.e., body microphones).

For example, Honeywell's existing Vocollect Soundsense SRX2 product enables a multi-microphone input to the speech detector that allows better rejection of ambient noise and impulses that would cause insertion. Unfortunately, the SoundSense SRX2 can only be run on specialized hardware. Further, the SRX2 and similar technologies are typically limited to microphones that are on the person of the user, rather than employing microphones that are distributed throughout the work environment.

Therefore, there exists a need for an improved system and method for addressing extraneous environmental sounds, in order to prevent those extraneous sounds from interfering with the desired operation of the voice driven systems.

SUMMARY

Accordingly, in one aspect, the present system and method solves the problem by employing both the microphone worn by the user (typically positioned near the user's mouth), and multiple microphones throughout the work environment. The present system and method compares sounds received at the user's microphone with the same sounds received concurrently at one or more of the environmental microphones. The present system and method then determines whether the sound originated local to the user, in which case it is most likely the user's voice; or whether the sound originated remotely from the user (that is, originated closer to one of the environmental microphones), in which case it is most likely an environmental sound.

In an embodiment of the present system and method, if the user's voice and an environmental sound occur concurrently, the present system and method may be able to digitally subtract the background sound from the voice/background-sound mix picked up by the user's microphone. The remaining voice sound can then be analyzed for speech content. In an embodiment of the present system and method, if the background sound is too strong and introduces excessive distortion, the audio sample can be eliminated (that is, determined to not be suitable for speech recognition).

In an embodiment of the present system and method, when the speech recognition device receives audio data packets from multiple microphones, the audio data packets may be received from asynchronous sources. The present system and method may employ recognition of impulse sounds to time-synchronize audio signals which would otherwise be asynchronous.

DETAILED DESCRIPTION

In the following description, certain specific details are set forth in order to provide a thorough understanding of various embodiments. However, one skilled in the art will understand that the invention may be practiced without these details. In other instances, well-known structures associated with voice recognition systems and speech recognition devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Electronic System for Voice Processing

The present system and method embraces electronic devices designed to interpret human speech and language, and to operate in response to human speech, also known as voice-driven systems, speech-driven systems, or spoken-language recognition systems.

Figure 1:
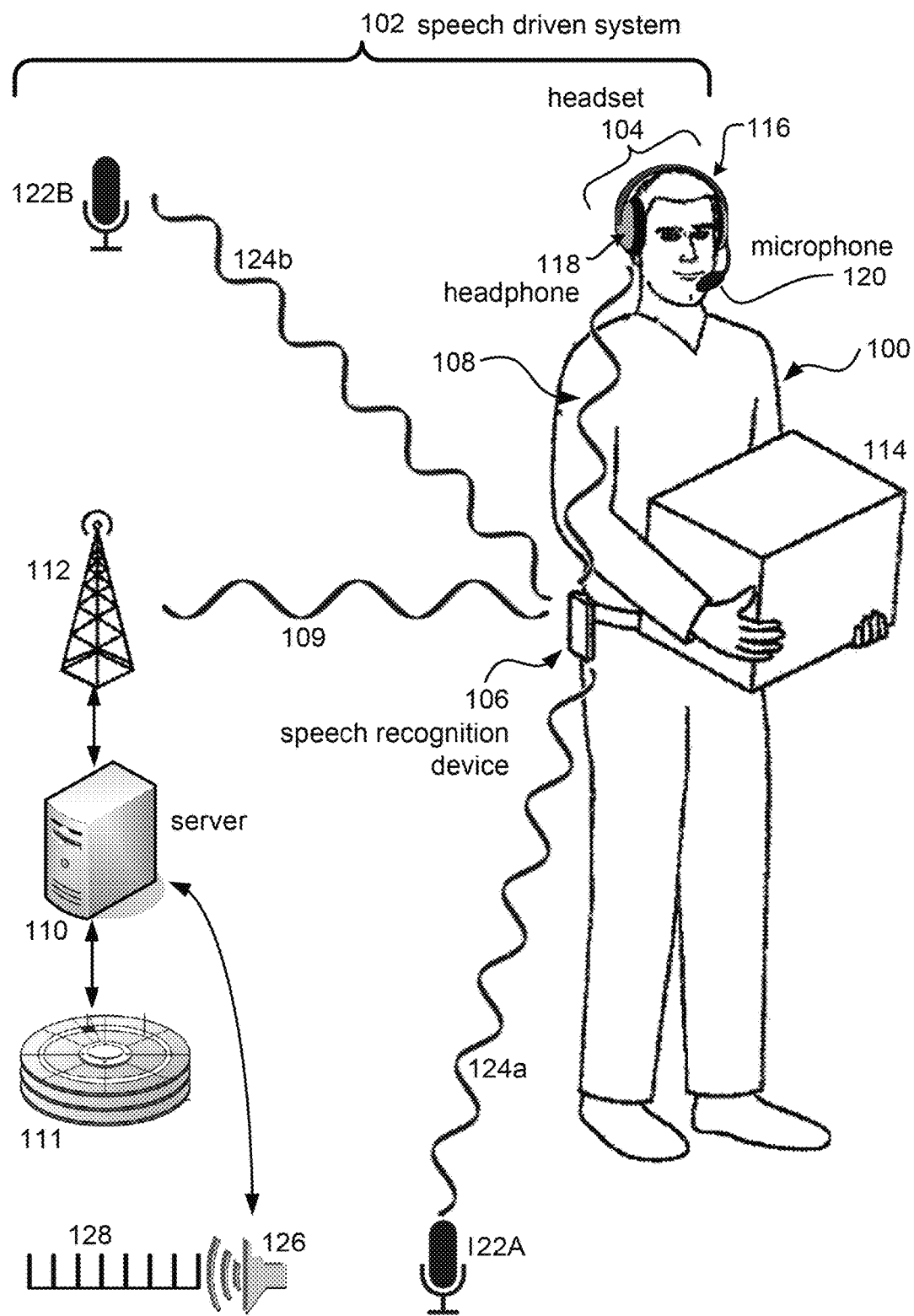
FIG. 1 is a view of an exemplary speech-driven system according to one exemplary embodiment of the present system and method.

FIG. 1 shows a user 100 interacting with an exemplary speech driven system 102, according to one embodiment of the present system and method.

In particular, the speech driven system 102 includes a headset 104 and a processor-based speech recognition device 106. In use, the user typically wears the headset 104, and optionally wears the processor-based speech recognition device 106. The processor-based speech recognition device 106 is communicatively coupled, either directly or indirectly, with the headset 104. For example, the processor-based speech recognition device 106 and headset 104 may be wirelessly communicatively coupled via one or more radios (e.g., transmitters, receivers, transceivers) as indicated by radio frequency signal 108. Alternatively, the processor-based speech recognition device 106 and headset 104 may be communicatively coupled via one or more cables, for instance one or more wires or optical cables (not shown).

Optionally, the speech driven system 102 may also include one or more backend computer systems 110 (only one shown), which may include or be communicatively coupled to one or more data stores stored on one or more non-transitory computer- or processor-readable media 111. The backend computer system(s) 110 is or are communicatively coupled to one or more processor-based speech recognition devices 106. For example, a wireless networking system may include one or more antennas 112 (only one shown) positioned about a work environment. Antenna 112 can provide wireless communications (for example, by radio frequency signal 109) between the one or more processor-based speech recognition devices 106 and the one or more backend computer system(s) 110.

The user 100 may engage in various activities which may require the use of the user's hands, for instance to handle goods or packages 114. Alternatively, the activities may not require use of the user's hands; however hand-free operation may be more comfortable or otherwise advantageous to the user 100.

The headset 104 may include a headband 116, one or more loud-speakers or headphones 118 (only one visible in FIG. 1), one or more microphones 120 (one visible in FIG. 1), and internal circuitry (not illustrated). The headband 116 allows the headset 104 to be securely worn by the user 100, and positions the loud-speakers 118 at least proximate one ear or next to each ear of the user 100. The microphone 120 may be positioned proximate and oriented toward a mouth of the user 100 when the headset 104 is worn.

The circuitry (not shown in FIG. 1) of the headset 104 may incorporate audio processing circuits such as audio filters and correlation circuitry associated with speech detection and/or speech recognition.

The processor-based speech recognition device 106 may be portable or stationary. For example, the processor-based speech recognition device 106 may be worn by the user 100, for instance on a belt as illustrated in FIG. 1. This allows the headset 104 to use relatively short range wireless communications devices, for instance Bluetooth radios, while ensuring that communications between the headset 104 and the processor-based speech recognition devices 106 is maintained during normal use.

Alternatively, the processor-based speech recognition device 106 may be manually carried or otherwise transported, for instance on a vehicle (e.g., fork lift, tug). Alternatively or additionally, the processor-based speech recognition device 106 may be stationary. Such implementations may employ a plurality of antennas positioned throughout a work environment and/or sufficiently more powerful communications devices, for instance WiFi radios.

The circuitry (not shown in FIG. 1) of the processor-based speech recognition device 106 may incorporate audio processing circuits for tasks such noise suppression and modeling, features vector generation, decoding, and other circuitry associated with speech detection and/or speech recognition.

The headset 104 and processor-based speech recognition device 106 permit various users 100 to communicate with one or more backend computer systems 110 (e.g., server computer systems). In use, the processor-based speech recognition device 106 receives digital instructions from the backend computer system 110 and converts those instructions to audio, which is provided to the user 100 via loud-speakers 118 of the headset 104. The user 100 provides spoken input via the microphone 120 of the headset, which the processor-based speech recognition device 106 may convert to a digital format (e.g., words, text, or digital encoding(s) which are symbolic of words and text) to be transferred to the backend computer system 110.

The backend computer system(s) 110 may be part of a larger system for sending and receiving information regarding the activities and tasks to be performed by the user(s) 100. The backend computer system(s) 110 may execute one or more system software routines, programs or packages for handling particular tasks. Tasks may, for example, include tasks related to inventory and warehouse management.

In an alternative embodiment of the present system and method, the backend computer system(s) 110 may implement some, or all, of the functionality otherwise described herein as being associated with the processor-based speech recognition device 106.

The backend computer system/server 110 may be any targeted computer or automated device, and may be located anywhere with respect to the user and the various components. For instance, the backend computer system 110 will typically be located remotely from the user, such as in another room or facility.

However, the background computer system 110 may be located locally with the user, for instance carried or worn by the user or carried by a vehicle operated by the user. In some implementations, that backend computer system 110 may be combined with the processor-based speech recognition device 106.

Optionally, the speech driven system 102 may also include one or more additional environmental microphones 122A, 122B (collectively 122). These microphones 122 may be distributed at various locations in the work (warehouse, factory, industrial) environment.

In an embodiment, the additional microphones 122 may be or may include the headset microphones 120 of other users. In an alternative embodiment, additional microphones 122 may be stationary microphones positioned at various points in the work environment (see FIG. 4 below for further discussion). In an alternative embodiment, microphones 122 may be collocated with various mobile elements such as vehicles (e.g., fork lift, tug) in the work environment. In an alternative environment, some or all of microphones 122 may be microphones on mobile computers, such as Honeywell's Dolphin 75E Hand-Held Computer, which are carried about by various users in the work environment.

In an embodiment of the present system and method, microphones 122 are used in whole or in part to help identify background sounds in the work/industrial environment. Microphones 122 may therefore connect or communicate with speech recognition device 106 via wireless communications 124a, 124b (collectively 124). In an alternative embodiment (not illustrated) microphones 122 may be configured to communicate indirectly with speech recognition device 106 via server 110 or other indirect network means.

Optionally, the speech driven system 102 may also include one or more environmental speakers 126 configured to emit sounds which can be heard throughout the work/industrial environment. Such environmental speakers 126 are in addition to and apart from any headset headphones 118. Fixed environmental speakers 126.F (see FIG. 4) may be established at fixed locations through the work/industrial environment. Mobile speakers 126.M (see FIG. 3) may be parts of speech recognition device 106, or may be attached to various mobile elements (such as mobile computers, including speech recognition devices 106) throughout the work/industrial environment.

In an embodiment of the present system and method, environmental speakers 126 may be communicatively coupled with server 110, server 110 thereby driving or controlling the production of sounds from speakers 126. Environmental speakers 126 may be used to emit sounds which can help synchronize audio signals from multiple sources. Environmental speakers 126 may be configured to emit synchronization sounds 128, such as pulsed audio signals, into the environment. Such synchronization is discussed further below in this document.

Non-Synchronous Signals:

In an embodiment of the present system and method, user microphone 120 and speech recognition device 106 communicate via a designated electronic interface and/or protocol, for example via a wired connection or via a Bluetooth connection 108 with certain designated parameters such as frame parameters. Environmental microphones 122 may also communicate with speech recognition device 106 via wireless communications 124, which may have a different set of communications parameters, such as a different frame rate.

In general, either or both of communications links 108, 124 may be via asynchronous communications protocols such as Bluetooth. As a result, signals (that is, data packets or frames) from user microphone 120 to speech recognition device 106 may be non-time-synchronous with respect to the signals that are sent from environmental microphones 122 to speech recognition device 106.

As a further consequence both of signal asynchrony and relative spatial arrangements, audio signals (that is, data frames) caused by a single environmental source at a particular time, but detected by different microphones 120, 122, may arrive at speech recognition device 106 at different times. It is a feature of the present system and method to synchronize such separate frames which were generated by a single environmental source at a common time.

Headset

Figure 2:
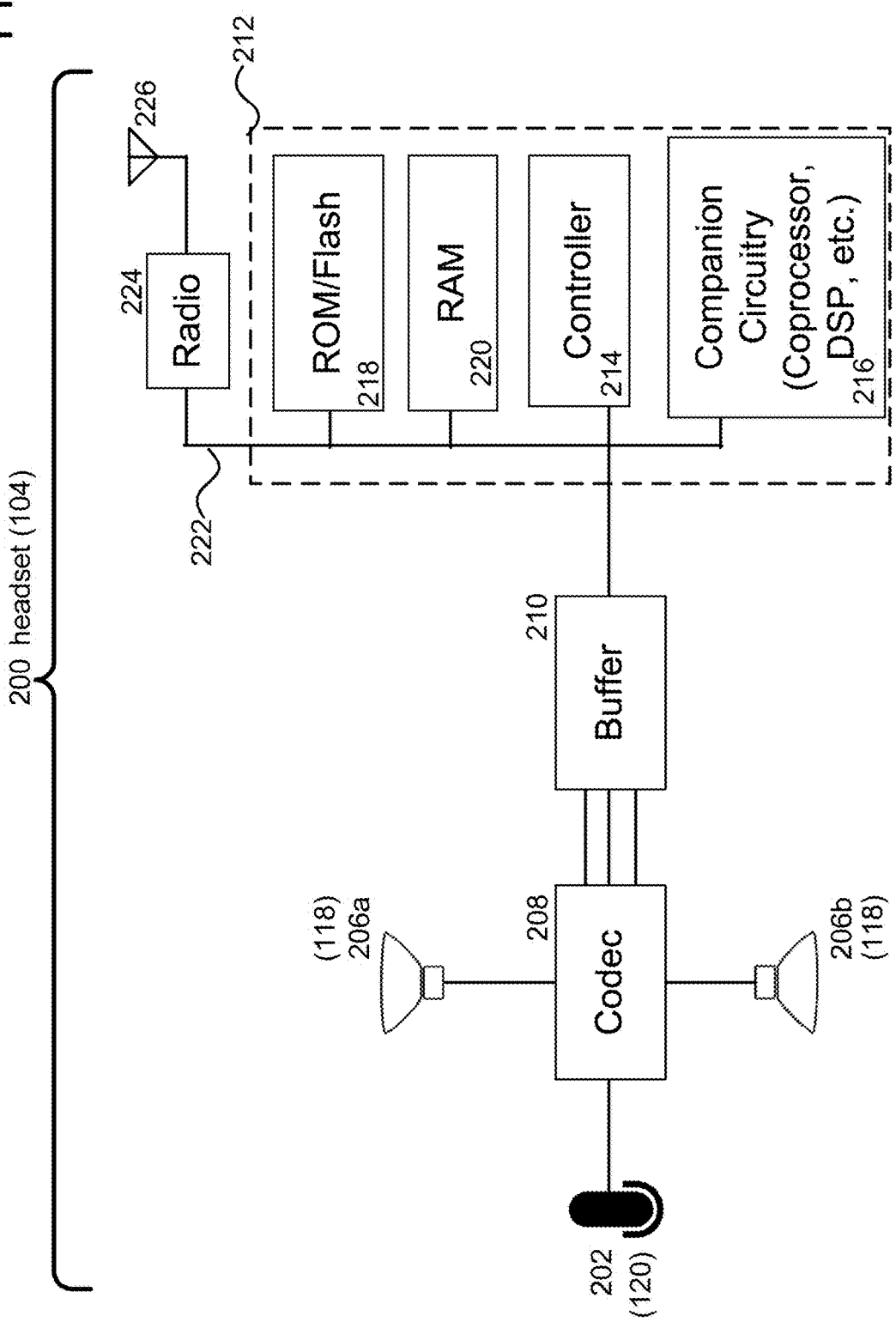
FIG. 2 is a system diagram of a headset identical or similar to that of FIG. 1, according to one exemplary embodiment of the present system and method.

FIG. 2 shows some of the components of an exemplary headset 200, according to one exemplary embodiment of the present system and method. The headset 200 may be similar or even identical to the exemplary headset 104 of FIG. 1.

The headset 200 includes a microphone 202 which may be similar or even identical to the exemplary microphone 120 of FIG. 1, and may include one or more secondary microphones (not shown). The microphone 202 is operable as a transducer to convert acoustic energy (e.g., sounds, such as voice or other sounds) to analog signals (e.g., voltages, currents) that have respective signal levels. The headset 200 preferably includes one or more loud-speakers 206a, 206b (two shown, collectively 206) which may be similar or even identical to the exemplary headphones 118 of FIG. 1. Each of the loud-speakers 206 is operable as a transducer to convert analog signals (e.g., voltages, currents) that have respective signal levels into acoustic energy (e.g., sounds, such as recorded or artificially generated spoken syllables, words or phrases or utterances).

The microphone(s) 202, 120 is (are) positioned or configured (e.g., directional and oriented) to primarily capture speech or utterances by the user 100. However, the microphone 202, 120 may also capture background speech from other users in the work environment, as well as background speech from PA systems.

The microphone 202, 120 may be positioned such that when the headset 104 (FIG. 1) is worn by a user 100, the microphone 202, 120 is positioned close to the mouth of the user 100. For example, the microphone 202, 120 may be carried at an end of an arm/boom of the headset 104 (FIG. 1), positioning the primary microphone 202, 120 proximate to the mouth of the user 100. Consequently, the speech sounds or utterances by the user 100 are typically louder, as recorded at the microphone 202, 120, than background speech sounds from other persons who are some distance from the microphone 202, 120.

With respect to PA systems, background speech from a PA system may be amplified, and so may be picked up by the microphone 202, 120 as being approximately as loud as the user speech. However, due to various factors—emanating from a remote loud-speaker, frequency band limitations of the PA system, and due to echoes and other factors—remote speech from a PA system may have different acoustic qualities at the microphone 202, 120 as compared to the acoustic qualities of user speech.

In other words, user speech or other utterances by the user 100 are likely to have different acoustic signatures than background speech from other persons at some distance from the user 100, and/or also different acoustic signatures from sounds from a PA system. In one embodiment, the present system and method may rely, in part or in whole, on signal processing techniques, as applied to such acoustic differences, to distinguish user speech from background speech.

In an alternative embodiment, some implementations of the present system and method may employ additional secondary microphones (not shown), for example two or more secondary microphones, to help distinguish user speech from background speech.

The headset 200 may include one or more audio coder/decoders (CODECs). For example, the headset 200 may include an audio CODEC 208 coupled to the microphone(s) 202, 120 to process analog signals from the microphone 202, 120 and produce digital signals representative of the analog signals. The CODEC 208, or another audio CODEC (not shown) may be coupled to the one or more loud-speakers 206, 118 to produce analog drive signals from digital signals in order to drive the loud-speakers 206, 118.

The headset 200 may include one or more buffers 210. The buffer(s) 210 may temporarily store or hold signals. The buffer 210 is illustrated as positioned relatively downstream of the CODEC 208 in a signal flow from the microphone 202.

The headset 200 includes a control subsystem 212. The control subsystem 212 may, for example include one or more controllers 214, one or more sets of companion circuitry 216, and one or more non-transitory computer- or processor-readable storage media such a non-volatile memory 218 and volatile memory 220.

The controller(s) 214 may take a variety of forms, for instance one or more microcontrollers, microprocessors, digital signal processors (DSPs), application specific integrated circuits (ASICs), programmable gate arrays (PGAs), graphical processing unit (GPUs) and/or programmable logic controllers (PLCs). Optional companion circuitry 216 may take the form of one or more digital, or optionally analog, circuits, which may or may not be in the form of one or more integrated circuits. The controller(s) 214 may function as a main processor, with the companion circuitry functioning as a co-processor to handle specific tasks. In some implementations, the companion circuitry 216 may take the form of one or more DSPs or GPUs.

Non-volatile memory 218 may take a variety of forms, for example one or more read only memories (ROMs), one or more writeable memories, for instance EEPROM and/or one or more FLASH memories. The volatile memory 220 may take a variety of forms, for example one or more random access memories (RAM) including static random access memory (SRAM) and/or dynamic random access memories (DRAM) for instance synchronous DRAM (SDRAM)). The various controllers 214, companion circuits 216, volatile memories 218 and/or nonvolatile memories 220 may be communicatively coupled via one or more buses (only one shown) 222, for instance instructions buses, data buses, address buses, power buses, etc.

The controllers 214 and/or companion circuitry 216 may execute instructions stored in or by the non-volatile memories 218 and/or volatile memories 220. The controllers 214 and/or companion circuitry 216 may employ data, values, or other information stored in or by the volatile memories 220 and/or nonvolatile memories 218.

In an embodiment of the present system and method, the control subsystem 212 may incorporate audio filtering circuitry or implement audio filtering by way of a general purpose processor which processes suitable instructions stored in non-volatile memory 218 or volatile memory 220. Audio filtering may, for example, implement signal processing or data comparisons as described further herein to distinguish acceptable user speech from background user speech. Audio filtering may rely upon a comparison of frames of speech provided from microphone 202, 120 via codec 208 and buffer 210, with previously-established speech samples stored in non-volatile memory 218 or volatile memory 220.

In an alternative embodiment of the present system and method, some or all audio filtering, speech-processing, and speech-comparisons may be instead be accomplished via circuitry on the speech recognition device 106 (FIG. 1), 300 (FIG. 3), and/or the server 110. In an alternative embodiment, some or all audio filtering may be distributed between hardware and/or software of the headset 104, 200, and hardware and/or software of the speech recognition device 106, 300, and/or the server 110.

In an embodiment of the present system and method, the sound signal from the microphone 202, 118 will be passed to the processor-based speech recognition device 106 (FIG. 1), 300 (FIG. 3) for speech recognition when a difference or variation between the received speech and the stored, standardized speech is small enough to indicate that audio is user speech and not just extraneous speech. (This is described further herein below.) In an alternative embodiment, all sounds detected by the headset 104, 200 are passed to the processor-based speech recognition device 106, 300, and the process of discriminating between user speech and background speech is performed instead by the speech recognition device 106, 300.

The headset 200 optionally includes one or more radios 224 (only one shown) and associated antennas 226 (only one shown) operable to wirelessly communicatively couple the headset 200 to the processor-based speech recognition device 106 and/or backend computer system 110. The radio 224 and antenna 226 may take a variety of forms, for example a wireless transmitter, wireless receiver, or wireless transceiver.

The radio 224 and antenna 226 may, for instance, be a radio suitable for short range communications, for example compatible or compliant with the BlueTooth protocol, which allows bi-directional communications (e.g., transmit, receive). Alternatively, the radio 224 and antenna 226 may take other forms, such as those compliant with one or more variants of the IEEE 802.11 protocols (e.g., 802.11n protocol, 802.11ac protocol). The radio 224 and antenna 226 may, for example, take the form of an RF communications card, received via a connector, for instance a PCMCIA slot, to couple the RF communications card to the controller 214. RF communications cards are commercially available from a large number of vendors. The range of the radio 224 and antenna 226 should be sufficient to ensure wireless communications in the expected work environment, for instance wireless communications with a processor-based speech recognition device 106, 300 worn by a same user as wears the headset 104, 200.

Processor-Based Speech Recognition Device

Figure 3:
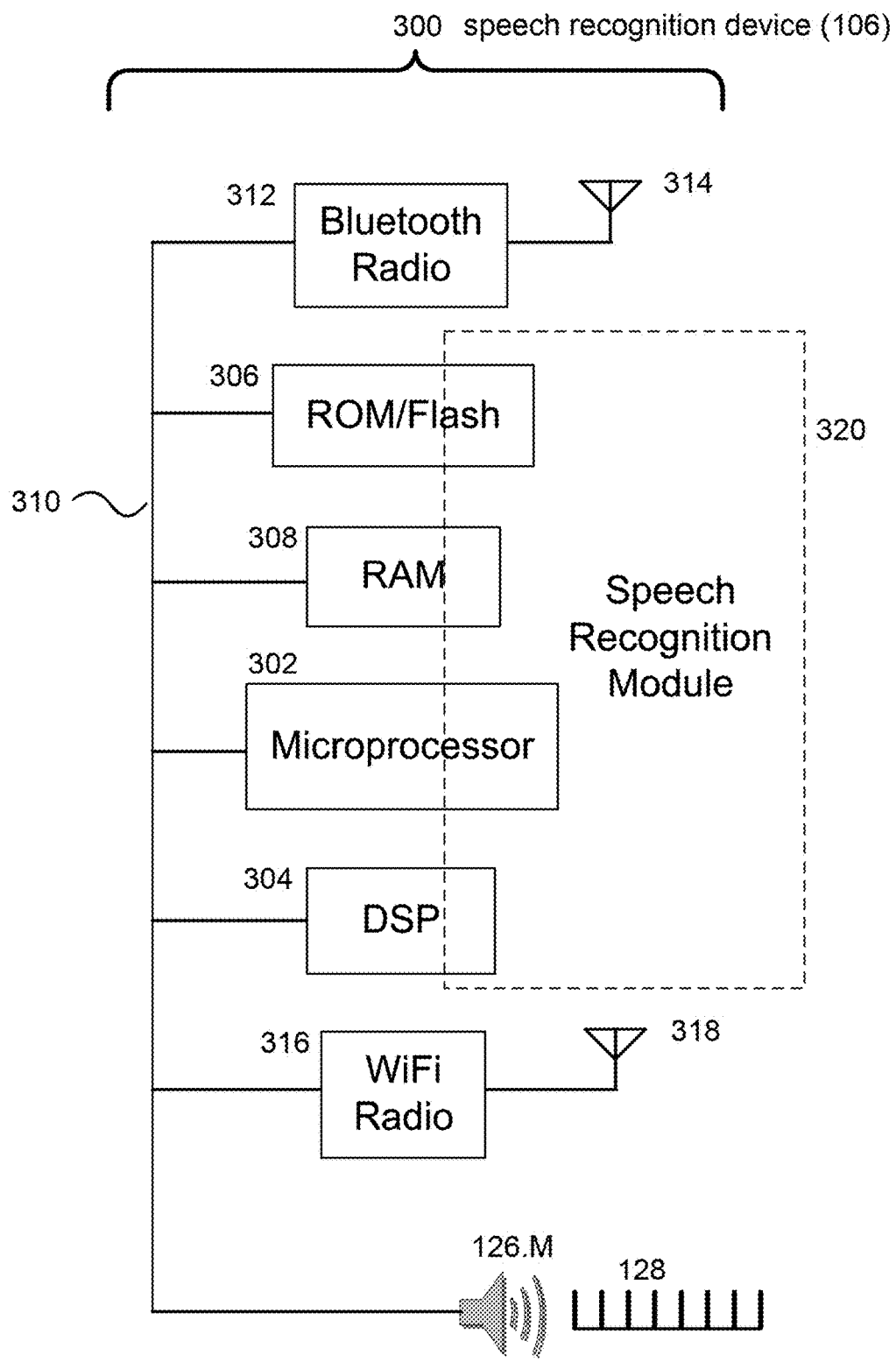
FIG. 3 is a system view of a speech recognition device identical or similar to that of FIG. 1, according to one exemplary embodiment of the present system and method.

FIG. 3 is a system diagram of an exemplary processor-based speech recognition device 300, according to one embodiment of the present system and method. The processor-based speech recognition device 300 may be similar to or even identical to the processor-based speech recognition device 106 of FIG. 1.

The processor-based speech recognition device 300 may include one or more controllers, for example a microprocessor 302 and DSP 304. While illustrated as a microprocessor 302 and a DSP 304, the controller(s) may take a variety of forms, for instance one or more microcontrollers, ASICs, PGAs, GPUs, and/or PLCs.

The processor-based speech recognition device 300 may include one or more non-transitory computer- or processor-readable storage media such as non-volatile memory 306 and volatile memory 308. Non-volatile memory 306 may take a variety of forms, for example one or more read-only memories (ROMs), one or more writeable memories, for instance EEPROM and/or or one or more FLASH memories. The volatile memory 308 may take a variety of forms, for example one or more random access memories (RAM) including static and/or dynamic random access memories. The various controllers 302, 304 and memories 306, 308 may be communicatively coupled via one or more buses (only one shown) 310, for instance instruction buses, data buses, address buses, power buses, etc.

The controllers 302, 304 may execute instructions stored in or by the memories 306, 308. The controllers 302, 304 may employ data, values, or other information stored in or by the memories 306, 308. The memories 306, 308 may for example store instructions which implement the methods described further below herein to distinguish user speech from background speech, as in exemplary methods 500 and 600 (see FIGS. 5 and 6, respectively). The controllers 302, 304, when implementing these instructions, thereby enable the speech recognition device 300, 106 to distinguish user speech from background speech.

The processor-based speech recognition device 300 optionally includes one or more radios 312 and associated antennas 314 (only one shown) operable to wirelessly communicatively couple the processor-based speech recognition device 300, 106 to the headset 200, 104. Such radio 312 and antenna 314 may be particularly suited to relatively short-range communications (e.g., 1 meter, 3 meters, 10 meters). The radio 312 and antenna 314 may take a variety of forms, for example a wireless transmitter, wireless receiver, or wireless transceiver. The radio 312 and antenna 314 may, for instance, be a radio suitable for short range communications, for example compatible or compliant with the Bluetooth protocol. The range of the radio 312 and antenna 314 should be sufficient to ensure wireless communications in the expected work environment, for instance wireless communications with a processor-based headset 104, 200.

The processor-based speech recognition device 300 optionally includes one or more radios 316 and associated antennas 318 (only one shown) operable to wirelessly communicatively couple the processor-based speech recognition device 300, 106 to the backend computer system/server 110 (FIG. 1), for example via one or more antennas 112 (FIG. 1) of a wireless network or communications system. The radio 316 and antenna 318 may take a variety of forms, for example a wireless transmitter, wireless receiver, or wireless transceiver.

The radio 316 and antenna 318 may, for instance, be a radio suitable for relatively longer range communications (e.g., greater than 10 meters), for example compatible or compliant with one or more variants of the IEEE 802.11 protocols (e.g., 802.11n protocol, 802.11ac protocol) or WiFi protocol. In an embodiment of the present system and method, the range of the radio 316 and antenna 318 are sufficient to ensure wireless communications in the expected work environment, for instance wireless communications with one or more antennas 112 (FIG. 1) positioned throughout the work environment.

In an embodiment, speech recognition device 300, 106 may include a speaker 126.M (already discussed above) configured to emit synchronization sounds 128 into the environment. In an alternative embodiment the speech recognition device 300, 106 does not have a speaker 126.M, and the speaker 126 (if any) is distributed elsewhere in the overall speech driven system 102.

Person's skilled in the art will appreciate that speech recognition device 106 may be an element or module of a more general purpose portable computer. As an example, and without being limiting, Honeywell's Dolphin™ 75E hand-held computer may provide for speech recognition, and also provides many other services such as barcode scanning, accepting digital signatures, supporting inventory management, and performing other tasks as well. It will be understood that those elements, modules, or subunits of hardware and software (ROM 306, RAM 308, Microprocessor 302, DSP 304) which are dedicated to speech recognition may be understood as collectively functioning as a speech recognition module 320 of the speech recognition device 306. It will also be understood that microprocessor 302 and/or DSP 304 may be designed for multitasking or timesharing, or be comprised of multiple smaller processors, such that microprocessor 302 and/or DSP 304 can perform both speech recognition and other tasks concurrently.

General Speech Analysis Considerations

Note that the terms frames and fragments are used interchangeably throughout this specification to indicate information associated with a segment of audio. Also note that frames or fragments for the purposes of classification into user speech and background speech do not necessarily need to correlate one-to-one to frames or fragments generated for purposes of feature generation for other aspects of speech recognition, e.g., speech detection, training, decoding, or general background noise removal. They may have many different parameters, such as using different frame rates, amounts of overlap, number of samples, number of bytes per frame, etc.

A speech recognition system attempts to map spoken human speech to known language vocabulary. To do so, a voice system will, among other operational elements, typically compare (i) received real-time speech against (ii) a stored template of previously captured/analyzed voice samples. Such an audio template is also referred to, for the present system and method, as the "audio characterization module."

In general, speech recognition may involve several general stages. Presented here is an exemplary general process for real-time speech interpretation.

(1) Conversion of Received Sound to Digital Signal—

Audio waves emanating from a human speaker, as well as nearby sounds from other sources, are converted to an analog electrical signal. This may be done for example by a microphone 120, 202 in a headset 104, 200. The analog electrical signal is then digitalized, i.e., converted to binary 1's and 0's. This may be accomplished for example by the CODEC 208 of the headset 104, 200, or by the processor 302 or DSP 304 of the speech recognition device 106, 300.

(2) Division of Digitized Sound into Frames—

The digitized sound is divided into frames, that is, segments of suitable length for analysis to identify speech. The length of segments may be geared to identify specific phonemes (sound units, such as a vowel sound or a consonant sound), or words or phrases.

NOTE: Further processing stages identified immediately below may be performed, for example, by the microprocessor 302 or digital signal processor 304 of the speech recognition device 106, 300, possibly based on instructions stored in non-volatile memory 306 or volatile memory 308. In an alternative embodiment, these tasks may be performed in whole or part by elements of headset 104, 200, or server 110.

(3) Conversion to Frequency Domain—

The frames of the received, digitized audio signal are typically converted from the time domain to the frequency domain. This is accomplished for example via a Fourier transform or Fast Fourier transform, or similar processing.

(4) Conversion to Secondary Representation (State Vectors)—

In an embodiment, a frequency domain representation may be converted to other mathematical representations better suited for further processing. For example, while the frequency domain representation may be substantially continuous, various forms of concise representations may encapsulate the essential or key elements of the frequency domain representation. For example, amplitudes at various specific frequencies may be captured, or amplitudes of only the peak frequencies may be captured. Various other mathematical encapsulations are possible as well. The resulting mathematical characterization of the audio frames is sometimes referred to as "state vectors".

(5) Normalizations and Other Supplemental Signal Processing—

One of the challenges inherent in voice recognition is that human voices differ in their harmonics and speech patterns; for example, the same exact word spoken by two different persons may sound dramatically different in a variety of respects, such as pitch, loudness, and duration, as well as variations due to age, accents, etc. To help compensate for this, voice systems typically attempt to normalize diverse samples of the same speech to similar mathematical representations. Thus, normalizations attempt to ensure that, for example, human vowel sounds (such as "ah", "eh", or "oh") coming from different speakers will all have a substantially similar mathematical representation, common to all speakers, during processing. The process of converting digitized speech samples from different speakers to a partially or substantially similar form is referred to as "normalization." A variety of established methods for normalization are known in the art.

In embodiments of the present system and method, one exemplary method of normalization is Vocal Length Tract Normalization (VTLN), which applies compensations for the varied pitches of the human voice (including, but not limited to, the typical differences between male and female voices). In alternative embodiments of the present system and method, another system of normalization which may be employed is Maximum Likelihood Linear Regression (MLLR), which adapts parameters within the stored template data to be a closer to match to a currently received sound signal.

Other signal conversions may be employed as well at various stages. For example, various frequency domains may be either boosted or suppressed.

(6) Comparison of Received Voice Signal Against the Template—

The processed, received voice signal is compared against a template of pre-processed, stored voice signals also referred to as the audio characterization module. A favorable comparison is indicative of a user voice, which is accepted by the speech driven system 102; an unfavorable comparison is indicative of a background voice (or possibly a user voice which is corrupted by extraneous background sounds), and which is thereby rejected by the voice driven system 102.

Further Details of Speech Analysis:

Some further details of a speech driven system 102 and a speech recognition device 106, 300 including some additional hardware elements, software or processing modules, and algorithms (including some elements of audio digitization, frame generation, audio decoding, speech vector generation, sound classification, hypothesis generation, confidence scores, and other elements) are known in the art; for further description see for example U.S. Patent Application No. 2014/0278931, filed Mar. 12, 2013, to Braho and Hardek, which is hereby incorporated herein by reference as if reproduced in its entirety.

Exemplary Audio Environment

The present system and method may be employed in a variety of organizational, corporate, and industrial environments, including for example and without limitation: factories, warehouses, indoor and outdoor construction sites, supply depots, product distribution facilities, mail distribution facilities, and other sites where worker (user) activities require or benefit from the support of hands-free, audio- and speech-driven interaction between the users and a data processing system.

Figure 4:
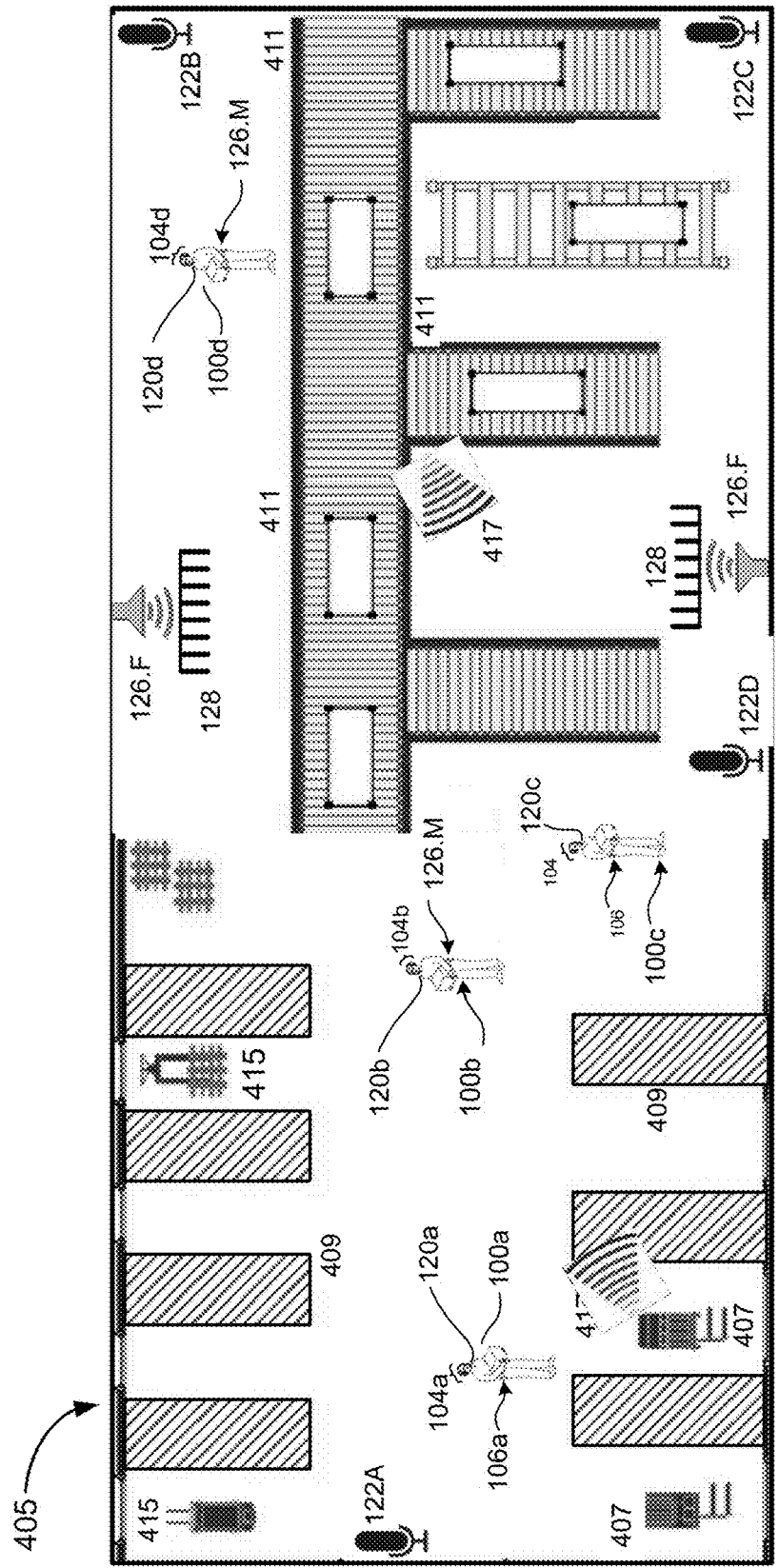
FIG. 4 illustrates an exemplary work environment, such as a warehouse or factory setting, where the present system and method may be operative.

FIG. 4 is a schematic drawing of an exemplary environment 405 where the present system and method may be employed. Environment 405 may for example be a warehouse or the warehouse section of a larger facility such as a factory. Warehouse 405 may have shelves, bins, drawers or cabinets 409 which are used for storage of various items (not shown) that may be picked up, put down, moved about or inventoried by users 100.

Users (that is, workers) 100 work throughout the environment, typically with headsets 104, 200 microphones 120, 202 and speech recognition devices 106, 300 as already discussed above.

Warehouse 405 may also have numerous sources of environmental noise/sounds 417, such as machinery or transport devices, for example forklifts 407, conveyer belts 411, and dollies 415. While not illustrated, background noise/sounds 417 may also include background speech from persons who are other than the user 100 of headset 104.

It will be noted that, from the perspective of a first user 100a, any speech from any other users 100b, 100c, and 100d would constitute background sounds 417. Similarly, from the perspective of a second user 100b, any speech from any other users 100a, 100c, and 100d would constitute background sounds 417.

Environmental sounds 417 may be detected by microphones 120, 202 of headsets 104, 200; as such, environmental sounds 417 may potentially interfere with or corrupt the voice detection/speech recognition processes of speech recognition device 106, 300. It is a feature of the present system and method to at least partially mitigate or alleviate such interference.

Environmental Microphones:

In an embodiment of the present system and method, environment 405 is configured with one or more environmental microphones 122A, 122B, 122C, 122D (collectively 122) which are distributed at points throughout, and which are communicatively coupled to server 110 (not shown) or to speech recognition devices 106, 300. Environmental microphones 122 can detect environmental sounds 417 and can also detect remote user speech (which is also detected by one or more headset microphones 120, 202).

In the environment 405, a sound may be emitted by a source of sound, which may include a user 100 who is speaking, or sources of environmental sounds 417 such as equipment and machinery 407, 411, 415.

An environmental sound 417 which is emitted from, for example, a particular forklift 407 may be detected by both a particular user (headset) microphone 120a; and also by one or more environmental microphones 122, such as microphone 122a. Similarly, a user speech which is emitted from, for example, a particular user 100a may be detected by both the particular user (headset) microphone 120a; and also by one or more environmental microphones 122, such as microphone 122a.

Both headset microphone 120a and environmental microphone 122a will generate audio signals (108, 124a, see FIG. 1, but not illustrated in FIG. 4) representative of the environmental sound 417 or user speech sound. However, the two electrical signals—one from headset microphone 120a and one from environmental microphone 122a—will typically not arrive at a common speech recognition device 106a at the same time. There may be at least two causes for the lack of time synchrony:

(i) The two different receiving microphones 120a, 122a are typically at different distances from the common sound source; and (ii) One or both of the communication signals generated by microphones 120a, 122a (along with associated electronics) may be inherently asynchronous in nature—for example, Bluetooth transmissions and other packet- or frame-oriented transmissions are inherently asynchronous.

Hence, although an environmental sound 417 or user speech may be emitted at one time from a single unitary sound source, multiple signals 108, 124 representative of the sound will not be synchronized in time upon being received by a particular user's speech recognition device 106a. It is a feature of the present system and method to provide for the synchronization of such otherwise non-synchronized audio signals generated by a common sound event from a common sound source.

Environmental Speakers:

In an embodiment of the present system and method, environment 405 is configured with one or more environmental speakers 126 which may be distributed at points throughout, and which may be communicatively coupled to server 110 (not shown), or to speech recognition devices 106, 300 or to both server 110 and speech recognition devices 106, 300. In an embodiment of the present system and method, one or more environmental speakers 126 may be a loudspeaker that is part of the speech recognition device 106 such as speaker 126.M (see FIG. 3).

In an embodiment of the present system and method, and as already noted above, environmental speakers 126 may be communicatively coupled with server 110, server 100 thereby driving or controlling the production of sounds from speakers 126. Environmental speakers 126 may be used to emit sounds which can help synchronize audio signals from multiple sources. Speakers 126 may be configured to emit synchronization sounds 128, such as pulsed audio signals, into the environment.

In an embodiment of the present system and method, synchronization sounds 128 may comprises brief pulse sounds or burst sounds, which are emitted at constant time intervals (for example, second between pulses, or 5 seconds between pulses, or 30 seconds) so that they are periodic, at a substantially constant sound intensity and a substantially constant audio spectrum shape (that is, the same sound for each pulse).

In an alternative embodiment, any of the pulse intensity(s), the pulse audio spectrum, and/or the time interval between pulses may be varied according to system-specified parameters or according to changes which may be determined by a system administrator. In an embodiment, a pulse sound or a series of pulse sounds may be triggered by some detected environmental event, for example by the detection of particular sounds by environmental microphones 122.

In an embodiment of the present system and method, environmental speakers 126 may also be used for other audio purposes, such as providing public address announcements in the work environment 405. In an alternative embodiment, public address or other announcements, if any, may be provided by a separate speaker system (not illustrated) which is not part of the speech driven system 102.

Distinguishing User Speech from Background Sounds and Background Speech

In general, speech recognition in a noise-filled environment benefits from the capacity of the speech recognition device 106, 300 to distinguish desired user speech (emanating from the device user 100), as against all other sounds (including both background sounds 417 and the voices of other persons in the work environment 405). It is an objective and feature of the present system and method to provide an enhanced capacity to distinguish desired user speech from background sounds and from the voices of other persons.

Some methods to distinguish user speech from background speech are already known in the art. See for example U.S. Patent Application No. 2014/0278931, filed Mar. 12, 2013, to Braho and Hardek, which is hereby included herein by reference as if reproduced in its entirety. See also U.S. patent application Ser. No. 15/220,584, filed Jul. 27, 2016, to Hardek, which is which is hereby incorporated herein by reference as if reproduced in its entirety.

Figure 5:
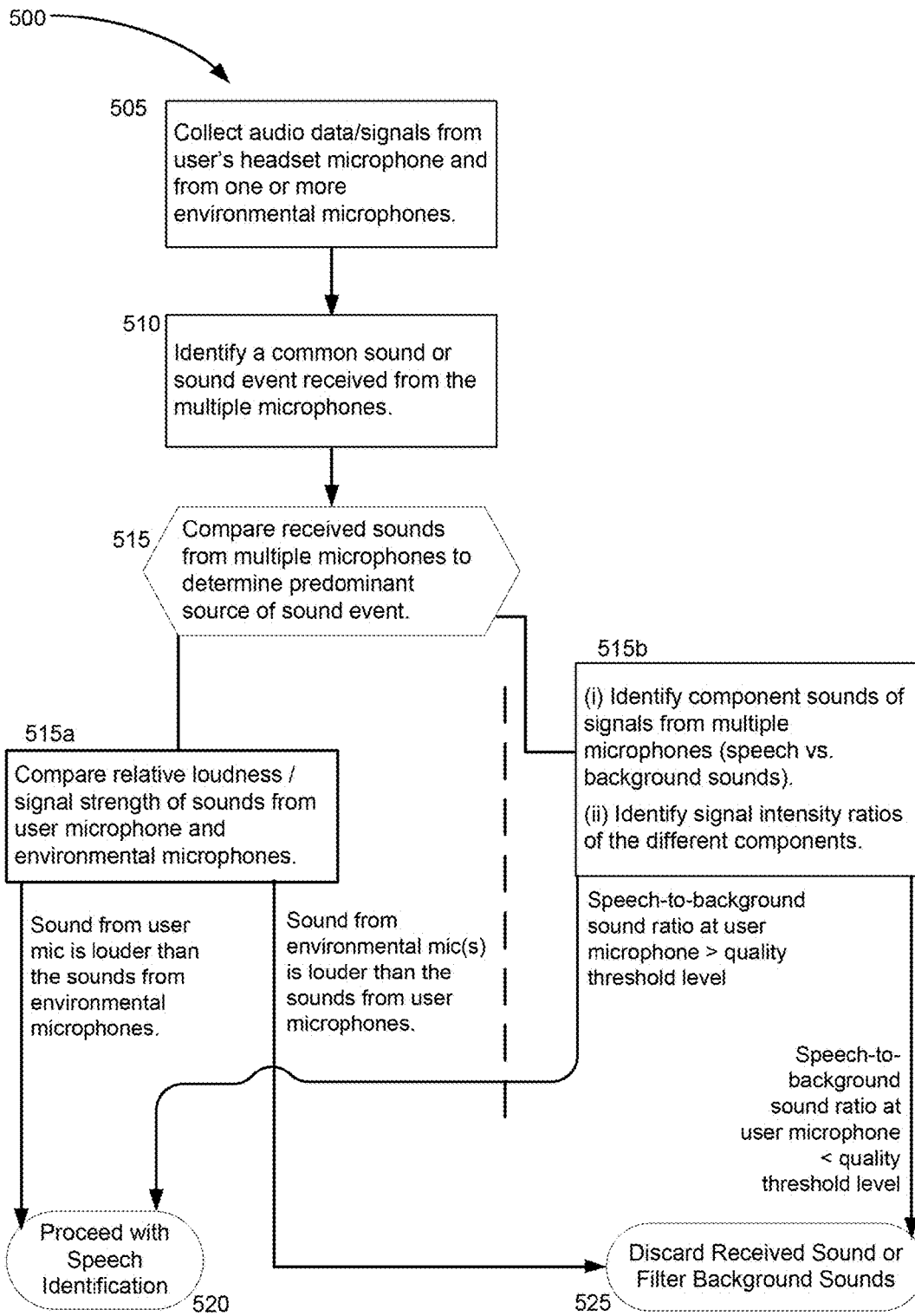
FIG. 5 is a flowchart of an exemplary method to minimize the disruptive effect of background sounds on speech recognition, according to one embodiment of the present system and method.

FIG. 5 is a flowchart of an exemplary method 500 to distinguish user speech, which is properly an input to the speech recognition process, from background sounds which should be excluded from the speech recognition process. The method 500 is typically made operational by running suitably configured software/firmware via the processor 302, DSP 304, or other electronics of the speech recognition device 106, 300. In an alternative embodiment, method 500 is made operational by running suitably configured software/firmware via the controller 214, companion circuitry 216, or other electronics of the headset 104, 200. In an alternative embodiment, method 500 is made operational by running suitably configured software/firmware on server 110. In all cases, the software or firmware is designed to implement the steps of the method 500, using suitable inputs as described below.

In an embodiment of the present system and method, a headset microphone 120 and one or more environmental microphones 122 are employed to help distinguish (i) user speech at the user's microphone 120 (which is properly an input to the speech recognition process) from (ii) other background sounds 417 and speech from any other person 417.

The method begins with step 505. In step 505, the speech driven system 102 collects audio data from a user's headset microphone 120, and also collects audio data from environmental microphones 122. For example, the method may be performed by speech recognition device 106*a* associated with user 100*a*, with headset 104*a* and microphone 120*a* (see FIG. 4).

In an embodiment, in step 505, the method may also collect audio data from other user microphones (for example, 120*b*, 120*c*, 120*d* of FIG. 4). With respect to user 100*a* and to microphone 120*a*, and for purposes of the remaining discussion of the method 500, other user microphones 120*b*, 120*c*, 120*d* shall be classified as being included among environmental microphones 122.

The collected audio data is collected in the form of audio signals 108, 124 (124*a*, 124*b*, etc., see FIG. 1) generated by headset 104*a*, environmental microphones 122, and their associated electronics.

In step 510, the method identifies a received sound which is a single sound or sound event, and which emanates from a common sound source(s) in the environment.

Single Sound or Sound Event from One Source:

As a first example, a single sound or single sound event from a single sound source may for example be a word, phrase, or sentence spoken by the user 100*a* of the speech recognition device 106*a*. As a second example, a single sound or single sound event from a single sound source may for example be a word, phrase, or sentence spoken by a person (100*b*, 100*c*, 100*d*) in the environment other than the user 100*a* of the speech recognition device 106*a*. As a third example, a single sound or single sound event from a single sound source may for example be a word, phrase, or sentence emitted by a public address system. As a fourth example, a single sound or single sound event from a single sound source may for example be an operational sound emitted by machinery 407, 411, 415 in the work environment 405, for example the sound of a forklift motor or forklift engine in operation; or the sound of a conveyor belt in operation. In some cases, a sound event, such as the sound of a conveyor belt, may be sustained over some extended period of operational time.

Single Sound Event Due to Multiple Concurrent Sources:

In some cases, sounds from different sources in the environment may occur at the same time. Thus, a user 100*a* may speak a word or phrase at the same time that a forklift 407 and a conveyor 411 are in use, resulting in overlapping sounds received by user microphone 120*a* and environmental microphones 122. Similarly, a user 100*a* may speak a word or phrase at the same time that another person 100*b* may also be speaking some distance away. Similarly, a user 100*a* may speak a word or phrase while equipment 407, 411, 415 is in use and another person 100*b* is speaking at the same time. Such combined sounds, which are emitted at substantially the same time, may arrive at user microphones 120*a* and environmental microphones 122 with slight relative time displacements due to various distance relationships between sound sources and the microphones. However, given a sufficiently long time frame (typically well under a second), such sounds will be received as being substantially overlapping and concurrent by all affected microphones.

The method 500 may identify a single sound event by a variety of criteria, which may be employed alone or in combination:

(i) In an embodiment of the present system and method, sounds (that is, audio signals) from the user microphone 120*a* and from environmental microphones 122 may be analyzed for their spectral features, to identify sounds with common spectral features.

(ii) In an embodiment, sounds of limited duration (for example, speech sounds such as words or sounds such as transitory machine sounds) may be analyzed for their duration; so that sounds from different microphones but of common duration (such as a particular spoken word or phrase) may be flagged as candidates for being the same sound.

(iii) In an embodiment, sounds which originated at the same time may be flagged as candidates for being the same sound from a common sound source. It will be noted that a variety of factors, including different signal transmission protocols, may present challenges in identifying sounds emitted at a common time. It is a feature of the present system and method to mitigate, in whole or in part, the difficulties in identifying the sound synchrony of sounds from multiple sources. Such features of the present system and method are discussed in further detail in conjunction with FIG. 6, below.

In step 515, the method determines if the received sound event is wholly or predominantly due to a speech utterance by the user 100*a*, or whether on the other hand the received sound event is wholly or predominantly due to a sound source which is other than a speech utterance by the user 100*a*.

A variety of analyses may be used to make the determination.

In an embodiment, as in step 515*a*, the method compares the sound intensity or signal level of the signals from the user microphone 100*a* and the environmental microphones 122.

If (as analyzed in step 515a) the sound from user microphone 100a is louder or has a higher signal level than the sounds from environmental microphones 122, the signal is determined to be due to user speech. In step 520, the method then proceeds with speech analysis of the received signal.

If (as analyzed in step 515a) the sound from user microphone 100a is softer or has a lower signal level than the sounds from environmental microphones 122, the signal is determined to be due to background sounds. In step 525, the method discards the received signal as not being user speech.

In an alternative embodiment, as in step 515b, the method: (i) first identifies distinct signal components of the received signals, for example speech and background sounds; the distinct signal components may be identified based on spectral analysis and other criteria; and (ii) then identifies the signal intensity ratio(s) of the different signal components. If the speech sounds come from the user 100a, then the speech sounds will typically predominate in the user microphone 104a, while background sounds will tend to predominate in environmental microphones 122.

If (as analyzed in step 515b) the speech-to-background sound ratio at user microphone 104a exceeds a designated quality threshold level, then in step 520, the method then proceeds with speech analysis of the received signal. The designated quality threshold may be determined based on generally known criteria for signal-to-noise ratios for speech processing, or based on system testing prior to field-use of the method. The threshold is established with a view towards making it likely that speech recognition can proceed with an acceptable level of reliability.

In an embodiment, if (as analyzed in step 515b) the speech-to-background sound ratio at user microphone 104a is below the designated quality threshold level, then in step 525, the method discards the received signal as either not being user speech or not being speech of acceptable quality for speech analysis.

In an embodiment, if (as analyzed in step 515b) the speech-to-background sound ratio at user microphone 104a is below the designated quality threshold level, then in step 525 the present system and method may be able to digitally subtract the background sound from the voice/background mix picked up by the user's microphone. Digital subtraction of a second sound from a mix of a first sound and a second sound may be accomplished according to various algorithms known in the art. Other means and methods of distinguishing and enhancing the user-voice component of the mixed-sound signal may be employed as well.

In an embodiment of the present system and method, elements of method steps 515a and 515b may both be employed to determine the suitability of the received sound signal for speech analysis. For example, in an embodiment, step 515a may be employed to determine if the signal of the user microphone 120a is sufficiently strong, relative to the signal(s) from environmental microphones 122, to proceed with further analysis. If the signal from user microphone 120 is deemed of sufficiently strong relative strength, the signal may then be analyzed for relative speech-to-background sound strength as per the step 515b.

Synchronization of Asynchronous Sound Signals

As described above, in various embodiments the present system and method may employ collection of audio signals from multiple microphones 120, 122 in the work environment 405. In an embodiment, these microphones all send their audio signals to one user's speech recognition device 106, 300 or to other computing resource accessible to the user 100.

The microphones 120, 122 may transmit their signals using transmission protocols, such as Bluetooth, which are asynchronous. "Asynchronous communication" refers to transmission of data, generally without the use of an external clock signal, where data can be transmitted intermittently rather than in a steady stream. For the present system and method, this means that sound may be recorded at a first time T0, say by environmental microphone 122A, or 122B, etc.; but the data transmission which represents the sound may not be transmitted until some later time Tn, where the length of time between T0 and Tn, or between Tn and T(n=1), may vary from one packet transmission to the next.

That is, the time of transmission of a data packet may not be the same as the time the data within the packet was collected. Any timing required to recover data from the communication symbols (data packets) must be encoded within the symbols; if such timing is not included in the data packets, then the time of arrival of the data packet cannot be assumed to reflect the time of data collection for that packet.

As described above, the present system and method may require comparisons of one or more sounds that were emitted at the same time, and recorded by multiple microphones 120, 122. But, as just noted, due to the asynchronous communications which may be employed, the data packets from multiple microphones, all capturing the same sound event or concurrent sound events, may arrive at the speech recognition device 106, 300 at different times.

To overcome this, the present system and method may provide for the correlation of multiple asynchronous audio sources.

In an embodiment, and by way of an example which should not be construed as limiting, a first user microphone 120 may record a sound event E (which may be a single sound from a single environment source, or multiple concurrent environmental sounds from multiple sound sources). The sound event E may be transmitted from the microphone 120, to the speech recognition device 106, 300 in a data packet P1 sent at time T1. (Due to travel at the speed of light, the data packet P1 may be presumed to arrive at the speech recognition device 106 substantially at the time T1.)

A second environmental microphone 122A may record the same sound event E, which may be transmitted from the microphone 122A to the speech recognition device 106, 300 in a data packet P2 sent at time T2. Because of both the asynchronous nature of the communications medium, and also possibly due the difference in distance between the sound source and the respective microphones, time T1 may differ significantly from time T2.

In an embodiment, the present system and method correlates packet P1 sent at time T1 with packet P2 sent at time T2. Based on the correlation, the present system and method then recognizes that packets P1 and P2 have captured a common sound event, and should be compared as described above (see FIG. 5).

In an embodiment of the present system and method, the microphone 120 associated with a mobile computer (such as speech recognition device 106, 300) is deterministic in time, lossless, and tightly coupled to the processor 302 that is expected to be running the speech recognition device 106. However, the environmental microphones 122 may still transmit an asynchronous signal. This still results in the need to correlate data packets which arrive at the speech recognition device 106, 300 at different times.

In an embodiment of the present system and method, a Bluetooth link may be the primary transport mechanism for this invention. These Bluetooth links can be lossy and non-time deterministic. This present system and method provides a mechanism for time correlating two (or more) audio streams via common embedded element analysis.

In one embodiment of the present system and method, correlation is provided for via random sound pulse events in the environment 405. If an impulse event like a dropped object occurs, the user headset 104a and the mobile device audio systems should both pick up the impulse simultaneously. The audio streams could be time correlated to the leading edge of the sound impulse event prior to being sent into the multi-microphone speech recognizer 106, 300.

In an alternative embodiment, and as already discussed above, a periodic, high frequency audio signal 128 could be emitted within the work environment 405 to serve as a synchronization signal. The high frequency signal could be emitted by the speaker 126.M of one of the speech recognition devices 106, 300. Alternatively, the high frequency period signal could be emitted by a fixed environmental speaker 126.F.

The emitted period signal is then picked up by the audio circuits on the speech recognition device 106, 300 and/or the headset 104, 200.

To avoid interference with normal, daily operations on the work environment 405, the emitted periodic signal 128 may be above the general hearing range of users, but lower than the effective frequency range of operation of the audio circuits. The periodic audio signal 405 could also be played loudly enough to be picked up by the microphone but too low for normal human hearing. The alignment signal 128 should be able to be discerned from the audio streams and allow the two audio streams to be time aligned.

Once the streams are time aligned, the multi-microphone speech detector 106, 300 should be able to be used to reject non-speech audio before it makes it to a speech recognition module 320 of the speech recognition device 106, 300.

Figure 6:
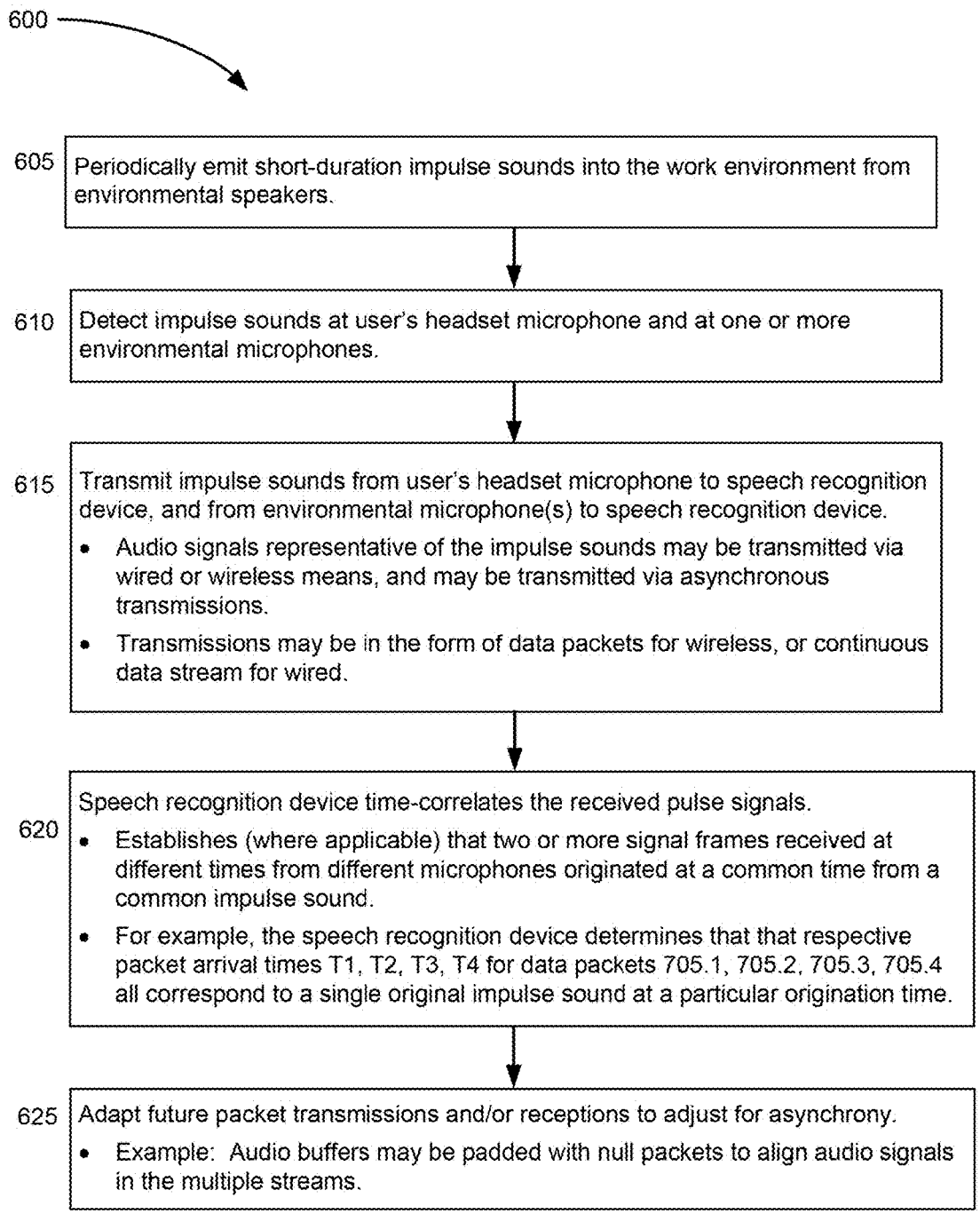
FIG. 6 is a flowchart of an exemplary method to synchronize data packets of audio information where the data packets are delivered via asynchronous media.
Figure 7:
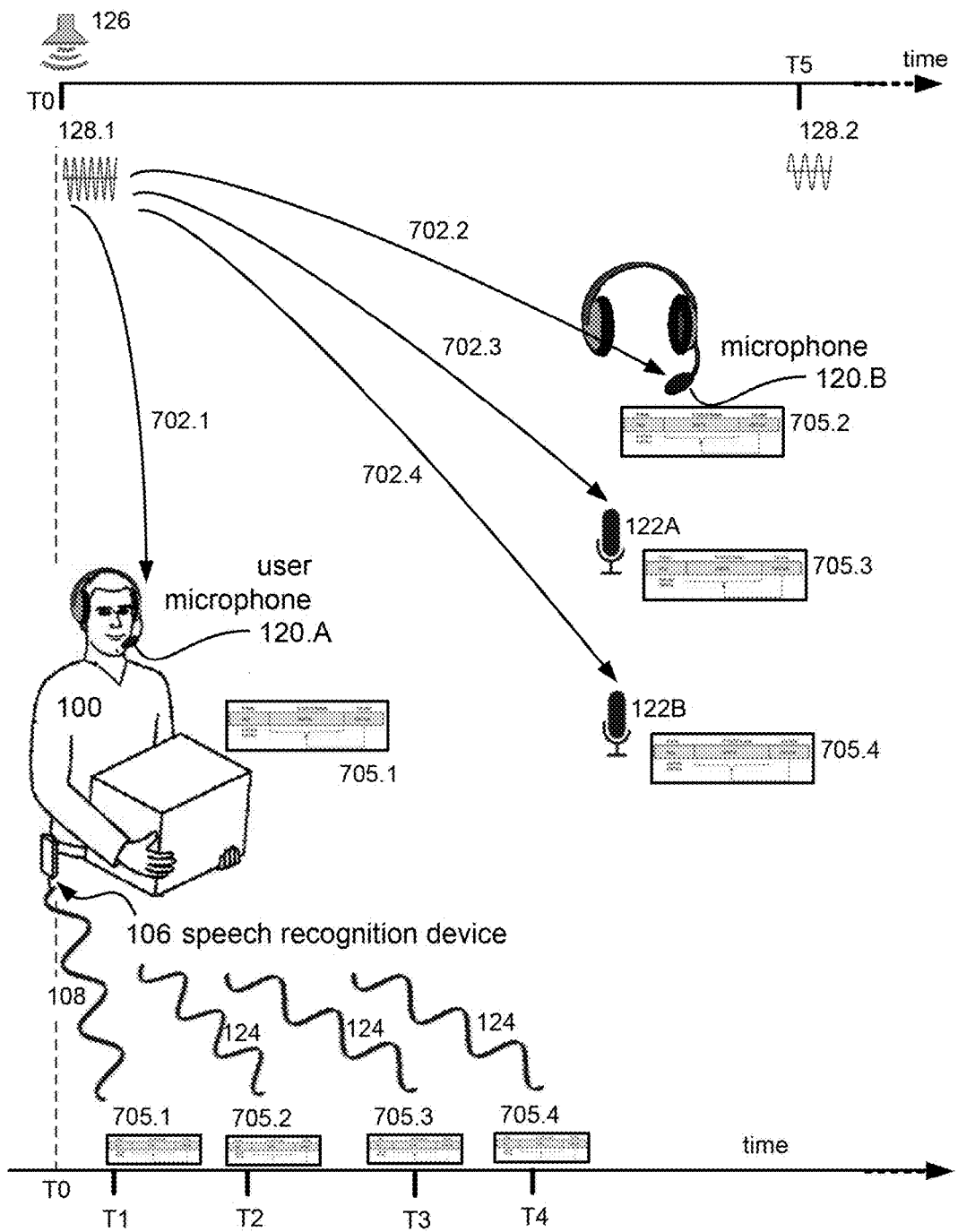
FIG. 7 provides an exemplary illustration of a speech recognition device receiving asynchronous audio data packets from multiple sound detectors.

FIG. 6 is a flow chart of an exemplary method 600 of synchronizing two different pulse data streams where at least one of the data streams is asynchronous with respect to the other(s). Reference will also be made here to FIG. 7, which illustrates an exemplary case of an audio pulse 128 being relayed to the speech recognition device 106 via several microphones 120, 122.

Exemplary method 600 is typically made operational by running suitably configured software/firmware via the processor 302, DSP 304, or other electronics of the speech recognition device 106, 300. In an alternative embodiment, method 600 is made operational by running suitably configured software/firmware via the controller 214, companion circuitry 216, or other electronics of the headset 104, 200. In an alternative embodiment, method 600 is made operational by running suitably configured software/firmware on server 110. In all cases, the software or firmware is designed to implement the steps of the method 600, using suitable inputs as described below.

Exemplary method 600 begins with step 605. In step 605, the present system and method emits a periodic high frequency audio signal, which in an embodiment may be a series of short-duration impulse sounds 128, referred to above as "pulsed audio signals" 128, and also referred to in terms of their application as "synchronization sounds" 128. In an embodiment, the sounds are emitted by one or more environmental speakers 126. The environmental speakers 126 may be in fixed locations in the work environment 405, or may be speakers 126 on the speech recognition devices 106, 300, or speakers on other portable computers in the work environment 405. See FIG. 7, which illustrates an environmental speaker 126 emitting a first audio pulse 128.1 at a first time T0, followed by a second audio pulse 128.2 at a second later time T5, with other pulses (not illustrated) to follow at later times. It will be noted from FIG. 7 that other events, such as signal transmissions, may occur at times T1, T2, T3, and T4 which are intermediate between T0 and T5, and that T0 through T5 are time sequential as numbered.

In an embodiment the impulse sounds 128 may be emitted at regular, periodic intervals, which in an embodiment may be configurable by a user or a system administrator. For example, the impulse sounds 128 may be emitted once every second, or once every five seconds, or once every minute. Other time intervals are possible as well. In an alternative embodiment, impulse sounds 128 may also be emitted at varied time intervals, possibly triggered by specified environmental events detected by other sensors.

In an embodiment, each impulse sound 128 is identical to the others, having a specific and unchanging spectral pattern or specific single frequency. In an embodiment, the pulses may be 8 kHz sound bursts. In an alternative embodiment, higher frequencies may be used, for example frequencies which are beyond the audible human range, for example above 20 kHz.

In an alternative embodiment, successive impulse sounds 128 may differ in their audio qualities in controlled, specified ways, for example in their audio frequency or audio spectrum. See for example FIG. 7, where second audio pulse 128.2 is of a different wavelength (and so a different frequency) than first audio pulse 128.1. In an embodiment, the impulse sounds may vary according to a repeating pattern (analogous to a series of different notes played sequentially on the piano, and repeated over and over again). In the latter embodiments, it is possible to identify specific audio pulses within a series based on their specific audio frequency and/or audio spectrum.

In step 610, the periodic pulse sounds 128 are detected by both the user's headset microphone 120 and by one or more environmental microphones 122. (See FIG. 7, which illustrates via curved arrow lines the audio pulse arriving at the user microphone 120.A and at environmental microphones 120.B, 122.A, and 122.B.) In an embodiment, the received pulses 128 may be time-stamped upon reception.

It will be noted that the received impulse sounds 128 are a component of the larger audio streams received by the microphones 120, 122, the larger audio streams 702 including user speech, speech by other persons, PA system sounds, and industrial sounds in the environment 405. Received pulse sounds 128 may be detected concurrently with other sounds in the audio stream 702. In an embodiment, the pulse sounds are sufficiently brief in duration, for example a tenth of a second or less, that they do not interfere substantially with speech recognition. In an embodiment, the pulse sounds are architected (that is, their waveforms are designed) so that they can be readily discerned from the other elements of the audio streams 702.

In step 615, and as illustrated in FIG. 7, both the user's microphone 120 and the one or more environmental microphone(s) 122 transmit a received impulse sound 128 to one or more processors, for example in the form of audio data packets 705 carried by radio frequency signals 108, 124. In an embodiment, the received impulse sounds are transmitted by the user's microphone 120 and the environmental microphones 122 to the speech recognition device 106 (which has a processor 302 and a digital signal processor (DSP) 304). As discussed above, some or all of the transmissions 108, 124 may be via asynchronous protocols (such as Bluetooth), which means the transmission time for the audio-data packets 705 may not be time-synchronized with the reception of the audio pulse signal 128 at the microphones 120, 122.

Time Correlation of Audio Pulses Received at Different Times:

In step 620, and prior to any speech recognition proper, the speech recognition device 106 (or other applicable processor) time-correlates the leading edges of the pulse audio signals received from microphones 120, 122. By time-correlates is meant the following (see FIG. 7 for illustration):

(620.1) A single audio impulse 128.1 was emitted by environmental speakers 126 at time T0.

(620.2) The single audio impulse sound was received at headset microphone 120.A, and at environmental microphones 120B, 122A, 122B after some small time delay (due to the speed of sound in air).

(620.3) The microphones 120.A, 120B, 122A, 122B transmit the single audio impulse in data packets 705.1, 705.2, 705.3, 705.4 (collectively 705) to the speech recognition device 106 (or other applicable processor) at times $Tn=T0+\Delta_n$ (n=1 to 4).

(620.4) Therefore, due to the asynchronous nature of at least some of the transmissions, the data packets 705 may arrive at speech recognition device 106 at different respective times, for example T1, T2, T3, T4 (all later than T0).

(620.5) Speech recognition device 106 identifies all four packets 705.1, 705.2, 705.3, 705.4 as originating from the single impulse sound 128.1. (This is discussed further immediately below.)

(620.6) Time correlation: Speech recognition device 106 time-correlates data packets 705.1, 705.2, 705.3, 705.4 by determining that respective packet arrival times T1, T2, T3, T4 all correspond to a single original impulse sound 128 and therefore to a common origination time T0.

As a result of the time correlation, the speech recognition device 106, and more generally the speech driven system as a whole, can identify sets of audio data packets 705 which arrive from different microphones 120, 122 at different times yet which are actually representative of audio generated at a common time. The audio data packets 705 in such sets are suitable for audio comparisons, as per the methods described earlier in this document (see for example FIG. 5 and associated discussion).

Identifying Packets as Originating from a Common Impulse Sound:

Returning to step 620.5, the present system and method identifies multiple data packets 705 from multiple microphones (e.g. 120.A, 120.B, 122A, 122B, etc.) as originating from a single impulse sound 128.

In an embodiment of the present system and method, impulse sounds 128 all share a distinctive waveform pattern, for example a specified high audio frequency (e.g., 8 kHz or 16 kHz) which is modulated with a pulse envelope, such as a rectangular pulse, a cosine squared pulse, or a Gaussian pulse. Therefore the speech recognition device 106 (or other applicable processing device) can readily identify data packets 705 which contain pulse sounds.

In an embodiment of the present system and method, it may be known that impulse sounds 128 are emitted at relatively long time intervals, while the differences in arrival time of the asynchronous data packets 705 from different microphones 120, 122 tend to be of much shorter intervals. In such embodiments, different pulse data packets 705 from different microphones 120, 122 can be identified as being due to the same impulse sound 128.1 if the pulse data packets from different microphones 120, 122 all arrive before the broadcast of the next audio pulses 128.2.

For example, the present system and method may emit impulse sounds 128 every thirty seconds; while the differences in arrival times of the asynchronous data packets 705 may be on the order of a few seconds (e.g., one to two seconds) or even fractions of a second. A series of pulse data packets 705 arriving from different microphones after broadcast of audio pulse 128.1 but before broadcast of audio pulse 128.2 can be presumed to be caused by audio pulse 128.1.

In an alternative embodiment, pulse sounds 128 are deliberately varied in a specified pattern, possibly a repeated pattern, over time. For example, a first pulse may be emitted at 8000 kHz, a second pulse at 9000 kHz, a third at 10,000 kHz, etc., up to for example a tenth pulse at 17,000 kHz; the pattern would then repeat itself. In such an embodiment, asynchronous data packets 705 arriving at different times would nonetheless convey pulse data pertaining to a specific frequency. In this way, such pulse data packets could be readily time-correlated with each other.

Adapting for Asynchronous Packet Delays:

Returning to the method 600, in step 625 the method adapts future audio RF signal transmissions and/or RF signal receptions to compensate for the asynchronous transmission properties identified in the previous steps.

In an embodiment of the present system and method, the audio streams 702 could be time correlated to the leading edge of the sound impulses 128 prior to being sent into the multi-microphone speech recognition device 106.

In an embodiment of the present system and method, time-stream alignment with buffer padding is used to align the audio streams 702. Memory buffers (not illustrated) for each of the audio stream 702 (from each of the microphones 120, 122) typically have a large capture of audio data. The sample rates for the audio streams 702 can be suitably adjusted. For example, and without limitation, suppose the sample rate for a first audio stream 702.1 is determined to be X, and the sample rate for the second audio stream 702.2 is determined to be 5*X, so they are misaligned by 5X. The buffer for the second audio stream 702.2 can then be padded (for example, with null data) to align the data in the two audio streams.

Using Environment-Generated Pulse Sounds

In an alternative embodiment, the present system and method does not generate sound pulses 128. Instead, the system and method relies on the occurrence of pulse sounds which may occur naturally in the work environment, such as the sudden "clang" of tools being dropped, or the "slam" of a door being closed, or similar. The speech recognition device 106 (or other applicable processor) is suitably configured to recognize such pulse sounds in the data streams 702 from the various microphones 120, 122; the speech recognition device then uses such pulse sounds to align the audio streams, in a manner similar to that described above.

An advantage of such an embodiment is that it does not require the generation of artificial pulse sounds. A possible disadvantage of such an embodiment is that the generation of environmental pulse sounds may be random and unreliable. Also, aligning audio streams 702 based on a single environmental pulse event assumes that the variability is constant, so that a constant stream offset(s) can be established based on a one-time impulse. If the microphones 120, 122 are in movement in the environment 405, the offsets may need to be adjusted over time. In such cases, a regularly generated series of audio pulses 128 may be preferred.

To supplement the present disclosure, this application incorporates entirely by reference the following commonly assigned patents, patent application publications, and patent applications:

U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; D702,237;
8,740,082; 8,740,085;
8,746,563; 8,750,445;
8,752,766; 8,756,059;
8,757,495; 8,760,563;
8,763,909; 8,777,108;
8,777,109; 8,779,898;
8,781,520; 8,783,573;
8,789,757; 8,789,758;
8,789,759; 8,794,520;
8,794,522; 8,794,525;
8,794,526; 8,798,367;
8,807,431; 8,807,432;
8,820,630; 8,822,848;
8,824,692; 8,824,696;
8,842,849; 8,844,822;
8,844,823; 8,849,019;
8,851,383; 8,854,633;
8,866,963; 8,868,421;
8,868,519; 8,868,802;
8,868,803; 8,870,074;
8,879,639; 8,880,426;
8,881,983; 8,881,987;
8,903,172; 8,908,995;
8,910,870; 8,910,875;
8,914,290; 8,914,788;
8,915,439; 8,915,444;
8,916,789; 8,918,250;
8,918,564; 8,925,818;
8,939,374; 8,942,480;
8,944,313; 8,944,327;
8,944,332; 8,950,678;
8,967,468; 8,971,346;
8,976,030; 8,976,368;
8,978,981; 8,978,983;
8,978,984; 8,985,456;
8,985,457; 8,985,459;
8,985,461; 8,988,578;
8,988,590; 8,991,704;
8,996,194; 8,996,384;
9,002,641; 9,007,368;
9,010,641; 9,015,513;
9,016,576; 9,022,288;
9,030,964; 9,033,240;
9,033,242; 9,036,054;
9,037,344; 9,038,911;
9,038,915; 9,047,098;
9,047,359; 9,047,420;
9,047,525; 9,047,531;
9,053,055; 9,053,378;
9,053,380; 9,058,526;
9,064,165; 9,064,167;
9,064,168; 9,064,254;
9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;

U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;

U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);
U.S. patent application Ser. No. 14/590,024 for SHELVING AND PACKAGE LOCATING SYSTEMS FOR DELIVERY VEHICLES filed Jan. 6, 2015 (Payne);
U.S. patent application Ser. No. 14/596,757 for SYSTEM AND METHOD FOR DETECTING BARCODE PRINTING ERRORS filed Jan. 14, 2015 (Ackley);
U.S. patent application Ser. No. 14/416,147 for OPTICAL READING APPARATUS HAVING VARIABLE SETTINGS filed Jan. 21, 2015 (Chen et al.);
U.S. patent application Ser. No. 14/614,706 for DEVICE FOR SUPPORTING AN ELECTRONIC TOOL ON A USER'S HAND filed Feb. 5, 2015 (Oberpriller et al.);
U.S. patent application Ser. No. 14/614,796 for CARGO APPORTIONMENT TECHNIQUES filed Feb. 5, 2015 (Morton et al.);
U.S. patent application Ser. No. 29/516,892 for TABLE COMPUTER filed Feb. 6, 2015 (Bidwell et al.);
U.S. patent application Ser. No. 14/619,093 for METHODS FOR TRAINING A SPEECH RECOGNITION SYSTEM filed Feb. 11, 2015 (Pecorari);
U.S. patent application Ser. No. 14/628,708 for DEVICE, SYSTEM, AND METHOD FOR DETERMINING THE STATUS OF CHECKOUT LANES filed Feb. 23, 2015 (Todeschini);
U.S. patent application Ser. No. 14/630,841 for TERMINAL INCLUDING IMAGING ASSEMBLY filed Feb. 25, 2015 (Gomez et al.);
U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);
U.S. patent application Ser. No. 29/519,017 for SCANNER filed Mar. 2, 2015 (Zhou et al.);
U.S. patent application Ser. No. 14/405,278 for DESIGN PATTERN FOR SECURE STORE filed Mar. 9, 2015 (Zhu et al.);
U.S. patent application Ser. No. 14/660,970 for DECODABLE INDICIA READING TERMINAL WITH COMBINED ILLUMINATION filed Mar. 18, 2015 (Kearney et al.);
U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);
U.S. patent application Ser. No. 14/662,922 for MULTIFUNCTION POINT OF SALE SYSTEM filed Mar. 19, 2015 (Van Horn et al.);
U.S. patent application Ser. No. 14/663,638 for VEHICLE MOUNT COMPUTER WITH CONFIGURABLE IGNITION SWITCH BEHAVIOR filed Mar. 20, 2015 (Davis et al.);
U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);
U.S. patent application Ser. No. 14/669,280 for TRANSFORMING COMPONENTS OF A WEB PAGE TO VOICE PROMPTS filed Mar. 26, 2015 (Funyak et al.);
U.S. patent application Ser. No. 14/674,329 for AIMER FOR BARCODE SCANNING filed Mar. 31, 2015 (Bidwell);
U.S. patent application Ser. No. 14/676,109 for INDICIA READER filed Apr. 1, 2015 (Huck);
U.S. patent application Ser. No. 14/676,327 for DEVICE MANAGEMENT PROXY FOR SECURE DEVICES filed Apr. 1, 2015 (Yeakley et al.);
U.S. patent application Ser. No. 14/676,898 for NAVIGATION SYSTEM CONFIGURED TO INTEGRATE MOTION SENSING DEVICE INPUTS filed Apr. 2, 2015 (Showering);
U.S. patent application Ser. No. 14/679,275 for DIMENSIONING SYSTEM CALIBRATION SYSTEMS AND METHODS filed Apr. 6, 2015 (Laffargue et al.);
U.S. patent application Ser. No. 29/523,098 for HANDLE FOR A TABLET COMPUTER filed Apr. 7, 2015 (Bidwell et al.);
U.S. patent application Ser. No. 14/682,615 for SYSTEM AND METHOD FOR POWER MANAGEMENT OF MOBILE DEVICES filed Apr. 9, 2015 (Murawski et al.);
U.S. patent application Ser. No. 14/686,822 for MULTIPLE PLATFORM SUPPORT SYSTEM AND METHOD filed Apr. 15, 2015 (Qu et al.);
U.S. patent application Ser. No. 14/687,289 for SYSTEM FOR COMMUNICATION VIA A PERIPHERAL HUB filed Apr. 15, 2015 (Kohtz et al.);
U.S. patent application Ser. No. 29/524,186 for SCANNER filed Apr. 17, 2015 (Zhou et al.);
U.S. patent application Ser. No. 14/695,364 for MEDICATION MANAGEMENT SYSTEM filed Apr. 24, 2015 (Sewell et al.);
U.S. patent application Ser. No. 14/695,923 for SECURE UNATTENDED NETWORK AUTHENTICATION filed Apr. 24, 2015 (Kubler et al.);
U.S. patent application Ser. No. 29/525,068 for TABLET COMPUTER WITH REMOVABLE SCANNING DEVICE filed Apr. 27, 2015 (Schulte et al.);
U.S. patent application Ser. No. 14/699,436 for SYMBOL READING SYSTEM HAVING PREDICTIVE DIAGNOSTICS filed Apr. 29, 2015 (Nahill et al.);
U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);
U.S. patent application Ser. No. 14/702,979 for TRACKING BATTERY CONDITIONS filed May 4, 2015 (Young et al.);
U.S. patent application Ser. No. 14/704,050 for INTERMEDIATE LINEAR POSITIONING filed May 5, 2015 (Charpentier et al.);
U.S. patent application Ser. No. 14/705,012 for HANDS-FREE HUMAN MACHINE INTERFACE RESPONSIVE TO A DRIVER OF A VEHICLE filed May 6, 2015 (Fitch et al.);
U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);
U.S. patent application Ser. No. 14/707,123 for APPLICATION INDEPENDENT DEX/UCS INTERFACE filed May 8, 2015 (Pape);
U.S. patent application Ser. No. 14/707,492 for METHOD AND APPARATUS FOR READING OPTICAL INDICIA USING A PLURALITY OF DATA SOURCES filed May 8, 2015 (Smith et al.);
U.S. patent application Ser. No. 14/710,666 for PRE-PAID USAGE SYSTEM FOR ENCODED INFORMATION READING TERMINALS filed May 13, 2015 (Smith);
U.S. patent application Ser. No. 29/526,918 for CHARGING BASE filed May 14, 2015 (Fitch et al.);
U.S. patent application Ser. No. 14/715,672 for AUGMENTED REALITY ENABLED HAZARD DISPLAY filed May 19, 2015 (Venkatesha et al.);
U.S. patent application Ser. No. 14/715,916 for EVALUATING IMAGE VALUES filed May 19, 2015 (Ackley);
U.S. patent application Ser. No. 14/722,608 for INTERACTIVE USER INTERFACE FOR CAPTURING A DOCUMENT IN AN IMAGE SIGNAL filed May 27, 2015 (Showering et al.);
U.S. patent application Ser. No. 29/528,165 for IN-COUNTER BARCODE SCANNER filed May 27, 2015 (Oberpriller et al.);
U.S. patent application Ser. No. 14/724,134 for ELECTRONIC DEVICE WITH WIRELESS PATH SELECTION CAPABILITY filed May 28, 2015 (Wang et al.);
U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);
U.S. patent application Ser. No. 14/724,908 for IMAGING APPARATUS HAVING IMAGING ASSEMBLY filed May 29, 2015 (Barber et al.);
U.S. patent application Ser. No. 14/725,352 for APPARATUS AND METHODS FOR MONITORING ONE OR MORE PORTABLE DATA TERMINALS (Caballero et al.);
U.S. patent application Ser. No. 29/528,590 for ELECTRONIC DEVICE filed May 29, 2015 (Fitch et al.);
U.S. patent application Ser. No. 29/528,890 for MOBILE COMPUTER HOUSING filed Jun. 2, 2015 (Fitch et al.);
U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);
U.S. patent application Ser. No. 14/732,870 for DATA COLLECTION MODULE AND SYSTEM filed Jun. 8, 2015 (Powilleit);
U.S. patent application Ser. No. 29/529,441 for INDICIA READING DEVICE filed Jun. 8, 2015 (Zhou et al.);
U.S. patent application Ser. No. 14/735,717 for INDICIA-READING SYSTEMS HAVING AN INTERFACE WITH A USER'S NERVOUS SYSTEM filed Jun. 10, 2015 (Todeschini);
U.S. patent application Ser. No. 14/738,038 for METHOD OF AND SYSTEM FOR DETECTING OBJECT WEIGHING INTERFERENCES filed Jun. 12, 2015 (Amundsen et al.);
U.S. patent application Ser. No. 14/740,320 for TACTILE SWITCH FOR A MOBILE ELECTRONIC DEVICE filed Jun. 16, 2015 (Bandringa);
U.S. patent application Ser. No. 14/740,373 for CALIBRATING A VOLUME DIMENSIONER filed Jun. 16, 2015 (Ackley et al.);
U.S. patent application Ser. No. 14/742,818 for INDICIA READING SYSTEM EMPLOYING DIGITAL GAIN CONTROL filed Jun. 18, 2015 (Xian et al.);
U.S. patent application Ser. No. 14/743,257 for WIRELESS MESH POINT PORTABLE DATA TERMINAL filed Jun. 18, 2015 (Wang et al.);
U.S. patent application Ser. No. 29/530,600 for CYCLONE filed Jun. 18, 2015 (Vargo et al);
U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);
U.S. patent application Ser. No. 14/744,836 for CLOUD-BASED SYSTEM FOR READING OF DECODABLE INDICIA filed Jun. 19, 2015 (Todeschini et al.);
U.S. patent application Ser. No. 14/745,006 for SELECTIVE OUTPUT OF DECODED MESSAGE DATA filed Jun. 19, 2015 (Todeschini et al.);
U.S. patent application Ser. No. 14/747,197 for OPTICAL PATTERN PROJECTOR filed Jun. 23, 2015 (Thuries et al.);
U.S. patent application Ser. No. 14/747,490 for DUAL-PROJECTOR THREE-DIMENSIONAL SCANNER filed Jun. 23, 2015 (Jovanovski et al.); and
U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, it will be understood by those skilled in the art that each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. In general, in the following claims, the terms used should not be construed to limit the invention to the specific embodiments disclosed in the specification and the claims, but should be construed to include all voice-recognition systems that read in accordance with the claims. Accordingly, the invention is not limited by the disclosure, but instead its scope is to be determined entirely by the following claims.

What is claimed is:

1. An electronic system configured to synchronize one or more mutually non-synchronous audio signals, comprising:
   a user microphone configured to be worn by a user or collocated with a speech organ of the user and to receive vocal input from the user, and to send to a coupled hardware processor a first audio signal representative of a first sound in the environment occupied by the user;
   the coupled hardware processor;
   a plurality of environmental microphones configured to be positioned remotely from the user and distributed at different locations in an environment occupied by the user, and to detect a second sound in the environment occupied by the user, wherein at least one environmental microphone of the plurality of environmental microphones is configured to be positioned at a location such that the detected second sound excludes the first sound; and
   a transmitter coupled to each environmental microphone of the plurality of environmental microphones, and configured to transmit to the hardware processor a second audio signal representative of the detected second sound; wherein:
   the first audio signal and the transmitted second audio signal are representative of a common, distinctive environmental sound event emanating from a single environmental source, but are mutually non-synchronous due to the spatial separation of the user microphone and each environmental microphone; and
   wherein the hardware processor is further configured to:
      receive the first audio signal from the user microphone and the second audio signal from the plurality of environmental microphones;
      determine that the first audio signal and the second audio signal both originated from the common, distinctive environmental sound event emanating from the single environmental source;
      determine a time correlation adjustment between the first audio signal and the second audio signal, said time correlation adjustment appropriate to time synchronize the distinctive environmental sound event of the first and second audio signals; and
      upon subsequently receiving a third sound signal and a fourth sound signal of a later-detected environmental sound which is detected respectively at each of the user microphone and the plurality of environmental microphones, applying said time correlation adjustment to synchronize in time the third sound signal and the fourth sound signal.

2. The electronic system of claim 1, wherein based on the time correlation adjustment, the hardware processor is further configured to synchronize a fifth audio signal which is streaming from the user microphone with a sixth audio signal which is streaming from each environmental microphone.

3. The electronic system of claim 1, wherein said hardware processor is further configured to:
   identify a first impulse-sound event in the environment as the common, distinctive environmental sound emanating from the single environmental source; and
   determine the time correlation adjustment between the first audio signal and the second audio signal based on the first impulse-sound event represented in both the first audio signal and the second audio signal.

4. The electronic system of claim 3, wherein said hardware processor is further configured to update the time correlation adjustment responsive to a second impulse sound event which is subsequent in time to the first impulse sound event.

5. The electronic system of claim 3, wherein the hardware processor is further configured to determine the time correlation adjustment based on a leading edge of the impulse sound event.

6. The electronic system of claim 1, further comprising a speaker configured to emit a periodic sound signal comprising a plurality of periodic sound pulses, wherein:
   said hardware processor is further configured to:
      identify a periodic sound pulse in the periodic sound signal, as received in both the first audio signal and the second audio signal, as the common distinctive environmental sound emanating from the single environmental source; and
      determine the time correlation adjustment between the first audio signal and the second audio signal based on the periodic sound pulse.

7. The electronic system of claim 6, wherein the hardware processor is further configured to update the time correlation adjustment responsive to successive periodic sound pulses in the periodic sound signal.

8. The electronic system of claim 6, wherein the speaker is further configured to emit a periodic sound which comprises at least one of:
   a frequency which is too high to be audible to a human listener; and
   a volume which is too low to be audible to a human listener.

9. The electronic system of claim 1, wherein the hardware processor is further configured to determine that the correlated third sound signal and fourth sound signal is one of a human speech sound or a background sound, based on a comparison of the sound as detected by the user microphone and the sound as detected by the plurality of environmental microphones.

10. The electronic system of claim 9, wherein the hardware processor is configured to determine if the later-detected environmental sounds which are time-correlated are a user speech sound or a background sound based on a relative sound intensity of the sound at each of the user microphone and the plurality of environmental microphones.

11. A method to synchronize one or more mutually non-synchronous audio signals, the method comprising:

at a user microphone of an electronic system, said user microphone configured to be worn by a user or collocated with a speech organ of the user, receiving a first audio signal representative of a first sound in the environment occupied by the user;

sending from the user microphone to a coupled hardware processor of the electronic system a first audio signal representative of the first sound;

at a plurality of environmental microphones of the electronic system configured to be positioned remotely from the user and distributed at different locations in an environment occupied by the user, detecting a second sound in the environment occupied by the user, wherein at least one environmental microphone of the plurality of environmental microphones is configured to be positioned at a location such that the detected second sound excludes the first sound; and via a transmitter of the electronic system coupled with each environmental microphone of the plurality of environmental microphones, transmitting to the hardware processor a second audio signal representative of the detected second sound, wherein:

the first audio signal and the transmitted second audio signal are representative of a common, distinctive environmental sound event emanating from a single environmental source, but are mutually non-synchronous due to the spatial separation of the user microphone and each environmental microphone; and receiving at the hardware processor the first audio signal from the user microphone and the second audio signal from the environmental microphone;

determining via the hardware processor that the first audio signal and the second audio signal both represent the common, distinctive environmental sound emanating from the single environmental source;

determining via the hardware processor a time correlation adjustment between the first audio signal and the second audio signal, wherein said time correlation adjustment is sufficient to synchronize in time a later-detected environmental sound which is detected at each of the user microphone and the environmental microphone; and upon subsequently receiving a third sound signal and a fourth sound signal of a later-detected environmental sound which is detected respectively at each of the user microphone and the plurality of environmental microphones, applying said time correlation adjustment to synchronize in time the third sound signal and the fourth sound signal.

12. The method of claim 11, further comprising:
synchronizing, via the hardware processor and based on the time correlation adjustment, a fifth audio signal which is streaming from the user microphone with a sixth audio signal which is streaming from the plurality of environmental microphones.

13. The method of claim 11, further comprising:
identifying a first impulse sound event in the environment as the common, distinctive environmental sound emanating from the single environmental source; and
determining the time correlation adjustment between the first sound wave and the second sound wave based on the first impulse-sound event.

14. The method of claim 13, further comprising:
updating the time correlation adjustment responsive to a second impulse sound event which is subsequent in time to the first impulse sound event.

15. The method of claim 13, further comprising:
determining the time correlation adjustment based on a leading edge of the impulse sound.

16. The method of claim 11, wherein the electronic system further comprises a speaker configured to emit a periodic sound signal comprising a plurality of sound pulses, the method further comprising:
emitting via the environmental speaker the periodic sound signal;
identifying via the hardware processor a periodic sound pulse in the periodic sound signal, as received in both the first audio signal and the second audio signal, as the common distinctive environmental sound emanating from the single environmental source; and
determining via the hardware processor the time correlation adjustment between the first audio signal and the second audio signal based on the periodic sound pulse.

17. The method of claim 16, further comprising:
updating the time correlation adjustment responsive to successive periodic sound pulses in the periodic sound signal.

18. The method of claim 16, further comprising:
emitting a periodic sound comprising at least one of:
an audio frequency which is too high to be audible to a human listener; and
an audio volume which is too low to be audible to a human listener.

19. The method of claim 11, further comprising:
determining via the hardware processor that the synchronized third sound signal and fourth sound signal is one of a human speech sound or a background sound, based on a comparison of the sound as detected by the user microphone and the sound as detected by the plurality of environmental microphones.

20. The method of claim 11, further comprising determining if the correlated third sound signal and fourth sound signal is a user speech sound or a background sound based on a relative sound intensity of the sound at each of the user microphone and the plurality of environmental microphones.

21. A voice-driven system configured for recognition of human speech by identifying a source of a sound as either a user speech or an environmental sound, comprising:
a user microphone configured to be worn by a user or collocated with a speech organ of the user, and further configured to receive a first sound comprising vocal input from the user and to send to a coupled hardware processor a first audio signal representative of the first sound;
the coupled hardware processor;
a plurality of environmental microphones configured to be positioned remotely from the user and distributed at different locations in an environment occupied by the user, and to detect an environmental sound in the environment occupied by the user, wherein at least one environmental microphone of the plurality of environmental microphones is configured to be positioned at a location such that the detected environmental sound excludes the the first sound; and
a transmitter coupled with each environmental microphone of the plurality of environmental microphones, and configured to transmit to the hardware processor a second audio signal representative of the detected environmental sound;
wherein the hardware processor of the voice-driven system is further configured to:

receive the first audio signal from the user microphone and the second audio signal from the plurality of environmental microphones;

determine that the first audio signal and the second audio signal are both indicative of the same one or more simultaneous sound events in the environment;

determine a relative sound content of the first audio signal and the second audio signal; and based on the relative sound content, determine that the first audio signal is suitable for identification of words from the user or that the first audio signal is not suitable for identification of words from the user.

22. The voice-driven system of claim 21, wherein the hardware processor is further configured to determine at least one of:

that the first audio signal is suitable for identification of words from the user based on a determination that the first audio signal has a predominant component of audio content originating from the user; and that the first audio signal is not suitable for identification of words from the user based on a determination that the first audio signal has a predominant component of audio content not originating from the user.

23. The voice-driven system of claim 21, wherein the hardware processor is further configured to:

identify an environmental sound of the second audio signal from the plurality of environmental microphones;

identify a plurality of sound components of the first audio signal from the user microphone, said plurality comprising the (i) same environmental sound identified in the second audio signal and (ii) a speech component from the user;

assess a signal-to-noise ratio within the first audio signal of the speech component of the user as compared to the environmental sound; and determine that the first audio signal is suitable or is not suitable for identification of words from the user based on the assessed signal-to-noise ratio.

24. The voice-driven system of claim 21, wherein the first audio signal of the user microphone and the transmitted second audio signal of the plurality of environmental microphones are mutually non-synchronous; and wherein the hardware processor of the speech recognition device is further configured to determine a time correlation adjustment between the first audio signal and the second audio signal, wherein said time correlation adjustment is sufficient to synchronize in time one or more environmental sounds which occurred at a same time, and which were detected at each of the user microphone and the plurality of environmental microphones.

25. A method to recognize human speech by identifying a source of a sound as either a user speech or an environmental sound, the method comprising:

at a user microphone of a voice-driven system, said user microphone configured to be worn by a user or collocated with a speech organ of the user, receiving a first sound;

sending from the user microphone to a coupled hardware processor of the voice-driven system a first audio signal representative of the first sound;

at a plurality of environmental microphones of the voice-driven system configured to be positioned remotely from the user and distributed at different locations in an environment occupied by the user, detecting a second sound in the environment occupied by the user, wherein at least one environmental microphone of the plurality of environmental microphones is configured to be positioned at a location such that the detected second sound excludes the first sound;

via a transmitter coupled with each environmental microphone of the plurality of environmental microphones, transmitting to the hardware processor a second audio signal representative of the second sound;

determining via the hardware processor that the first audio signal and the second audio signal are indicative of the same one or more substantially simultaneous sound events in the environment;

determining via the hardware processor a relative sound content of the first audio signal and the second audio signal; and based on the relative sound content, determining that the first audio signal is suitable for identification of words from the user or that the first audio signal is not suitable for identification of words from the user.

26. The method of claim 25, wherein the method further comprises determining at least one of:

that the first audio signal is suitable for identification of words from the user based on a determination that the first audio signal is dominated by an audio content originating closer to the user microphone than to the plurality of environmental microphones; and that the first audio signal is not suitable for identification of words from the user based on a determination that the first audio signal is dominated by an audio content originating closer to an environmental microphone than to the user microphone.

27. The method of claim 25, further comprising:

identifying via the hardware processor an environmental sound of the second audio signal from the plurality of environmental microphones;

identifying via the hardware processor a plurality of sound components of the first audio signal from the user microphone, said plurality comprising (i) the same environmental sound identified in the second audio signal and (ii) a speech component from the user;

determining via the hardware processor a signal-to-noise ratio within the first audio signal of the speech component from the user as compared to the environmental sound; and determining via the hardware processor that the first audio signal is suitable or is not suitable for identification of words from the user based on the determined signal-to-noise ratio.

28. The method of claim 25, wherein the first audio signal and the transmitted second audio signal are mutually non-synchronous, and wherein the method further comprises:

determining via the hardware processor a time correlation adjustment between the first audio signal and the second audio signal, wherein said time correlation adjustment is sufficient to synchronize in time a later-detected environmental sound from a single sound source which is detected at each of the user microphone and the plurality of environmental microphones.

* * * * *